(12) United States Patent
Ling et al.

(10) Patent No.: US 11,916,504 B2
(45) Date of Patent: Feb. 27, 2024

(54) ENERGY CONVERSION DEVICE AND VEHICLE

(71) Applicant: BYD COMPANY LIMITED, Guangdong (CN)

(72) Inventors: Heping Ling, Shenzhen (CN); Jicheng Li, Shenzhen (CN); Changjiu Liu, Shenzhen (CN); Feiyue Xie, Shenzhen (CN); Yuxin Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 167 days.

(21) Appl. No.: 17/763,962

(22) PCT Filed: Aug. 18, 2020

(86) PCT No.: PCT/CN2020/109885
§ 371 (c)(1),
(2) Date: Mar. 25, 2022

(87) PCT Pub. No.: WO2021/057339
PCT Pub. Date: Apr. 1, 2021

(65) Prior Publication Data
US 2022/0329195 A1 Oct. 13, 2022

(30) Foreign Application Priority Data

Sep. 25, 2019 (CN) .......................... 201910913787.3

(51) Int. Cl.
*H02P 1/00* (2006.01)
*H02P 3/00* (2006.01)
(Continued)

(52) U.S. Cl.
CPC ............... *H02P 27/08* (2013.01); *B60L 1/02* (2013.01); *B60L 53/22* (2019.02); *H02M 7/797* (2013.01); *H02P 25/22* (2013.01)

(58) Field of Classification Search
CPC ........ H02P 27/08; H02P 25/22; H02M 7/797; B60L 53/22; B60L 1/02
(Continued)

(56) References Cited

U.S. PATENT DOCUMENTS

| 2011/0075315 A1 | 3/2011 | Dickerhoof et al. |
| 2013/0152892 A1 | 6/2013 | Hawkins et al. |
| 2013/0241463 A1 | 9/2013 | Bando et al. |

FOREIGN PATENT DOCUMENTS

| CN | 101537779 A | 9/2009 |
| CN | 103171448 A | 6/2013 |

(Continued)

OTHER PUBLICATIONS

International Search Report and Written Opinion for Application No. PCT/CN2020/109885, dated Nov. 26, 2020, 12 pages.

*Primary Examiner* — Erick D Glass

(57) ABSTRACT

An energy conversion device is provided. The energy conversion device includes a reversible pulse-width modulation (PWM) rectifier (102) and a motor coil (103). The motor coil (103) includes L sets of winding units, and each set of winding unit is connected with the reversible PWM rectifier (102), where L≥2 and is a positive integer. At least two sets of heating circuits of a to-be-heated device are formed by an external power supply (100), the reversible PWM rectifier (102), and the winding units in the motor coil (103). The energy conversion device controls the reversible PWM rectifier (102) according to a control signal, so that a current outputted from the external power supply (100) flows through at least two sets of winding units in the motor coil (103) to generate heat.

17 Claims, 10 Drawing Sheets

(51) Int. Cl.
 *H02P 5/00* (2016.01)
 *H02P 27/08* (2006.01)
 *B60L 53/22* (2019.01)
 *B60L 1/02* (2006.01)
 *H02M 7/797* (2006.01)
 *H02P 25/22* (2006.01)
(58) Field of Classification Search
 USPC .......................................................... 318/139
 See application file for complete search history.

(56) References Cited

FOREIGN PATENT DOCUMENTS

| | | | |
|---|---|---|---|
| CN | 107276316 | A | 10/2017 |
| CN | 107592954 | A | 1/2018 |
| CN | 108123491 | A | 6/2018 |
| CN | 108199624 | A | 6/2018 |
| CN | 108306078 | A | 7/2018 |
| CN | 108621743 | A | 10/2018 |
| CN | 110116653 | A | 8/2019 |
| CN | 111347887 | A | 6/2020 |
| CN | 111347890 | A | 6/2020 |
| CN | 111347900 | A | 6/2020 |
| CN | 111347901 | A | 6/2020 |
| CN | 111355429 | A | 6/2020 |
| EP | 3006257 | A1 | 4/2016 |
| GB | 2537351 | A | 10/2016 |
| JP | 2000292017 | A | 10/2000 |
| JP | 2010051092 | A | 3/2010 |
| JP | 2012165526 | A | 8/2012 |
| JP | 2016086502 | A | 5/2016 |
| WO | 2013175050 | A1 | 11/2013 |

ENERGY CONVERSION DEVICE AND VEHICLE

CROSS-REFERENCE TO RELATED APPLICATIONS

This application is a National Phase Application of International Patent Application No. PCT/CN2020/109885, filed on Aug. 18, 2020, which is based on and claims priority to and benefits of Chinese Patent Application No. 201910913787.3, filed on Sep. 25, 2019 and entitled "ENERGY CONVERSION DEVICE AND VEHICLE". The entire content of all of the above-identified applications is incorporated herein by reference.

FIELD

The disclosure relates to the field of vehicle technologies, and more specifically, to an energy conversion device and a vehicle.

BACKGROUND

With the continuous popularization of electric vehicles, more and more electric vehicles will enter the society and families and bring great convenience for people's travel. Lithium-ion batteries are usually used as power batteries in the electric vehicles. The general working temperature of the lithium-ion batteries ranges from −20° C. to 55° C., and the lithium-ion batteries is not allowed to be charged below low temperatures. In the prior art, a solution for heating the low temperature battery is to heat a cooling liquid of the battery cooling circuit by a Positive Temperature Coefficient (PTC) heater or an electric heating wire heater or an engine or a motor at a low temperature, and the battery cell is heated to a predetermined temperature by the cooling liquid. In addition, when the battery is at a low-temperature and low-battery state, such as an extreme condition of −19° C. and State of Charge (SOC)=0, the battery does not allow discharge, only allows small current charging and high power heating and low power charging. However, the PTC heater is incapable of implementing heating while charging, resulting in a long charging time of the battery.

In conclusion, in the prior art, when the heat equipment is adopted to heat the power battery at the low temperature, there are problems of an increase in costs and an excessively long charging time at the low temperature caused by a match failure of a charging process and a heating process.

SUMMARY

The disclosure is intended to resolve one of technical problems in the related art at least to some extent.

The disclosure provides an energy conversion device and a vehicle, to solve the problems of an increase in costs, and an excessively long charging time at the low temperature caused by that the charging process and the heating process cannot be closely marched, when the heat equipment is adopted to heat the power battery at the low temperature.

The disclosure is implemented in this way. A first aspect of the disclosure provides an energy conversion device, including a reversible pulse-width modulation (PWM) rectifier and a motor coil. The motor coil includes L sets of winding units, and each of the L sets of winding units is connected to the reversible PWM rectifier, where L≥2 and is a positive integer.

At least two sets of heating circuits of a to-be-heated device are formed by an external power supply, the reversible PWM rectifier, and the winding units in the motor coil.

The energy conversion device controls the reversible PWM rectifier according to a control signal, so that a current outputted from the external power supply flows through at least two sets of winding units of the motor coil to generate heat. And a vector sum of resultant current vectors of quadrature axis currents of the at least two sets of winding units in a synchronous rotating reference frame based on motor rotor field orientation is zero.

A second aspect of the disclosure provides a vehicle. The vehicle further includes the energy conversion device provided in the first aspect.

The technical effects of the energy conversion device provided in the disclosure are as follows. When the energy conversion device is connected with the external power supply by using the energy conversion device including the reversible PWM rectifier and the motor coil, the external power supply, the reversible PWM rectifier, and the winding units in the motor coil form at least two sets of heating circuits. The reversible PWM rectifier is controlled, to cause a current outputted from the external power supply to flow through at least two sets of winding units of the motor coil to generate heat, a vector sum of resultant current vectors of a quadrature axis current of the at least two sets of winding units in a synchronous rotating reference frame based on motor rotor field orientation to be zero, and a motor in the energy conversion device not to output torque, to heat a cooling liquid in the cooling pipe flowing through a cooling tube of the motor coil. A power battery is heated when the cooling liquid flows through the power battery, and an additional power battery heating device can be omitted, thereby reducing the costs of the entire device.

Additional aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description of the embodiments made with reference to the following accompanying drawings.

DETAILED DESCRIPTION

The following describes embodiments of this application in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain this application and cannot be construed as a limitation to this application.

To describe technical solutions in this application, the following will be described by using specific embodiments.

Figure 1:
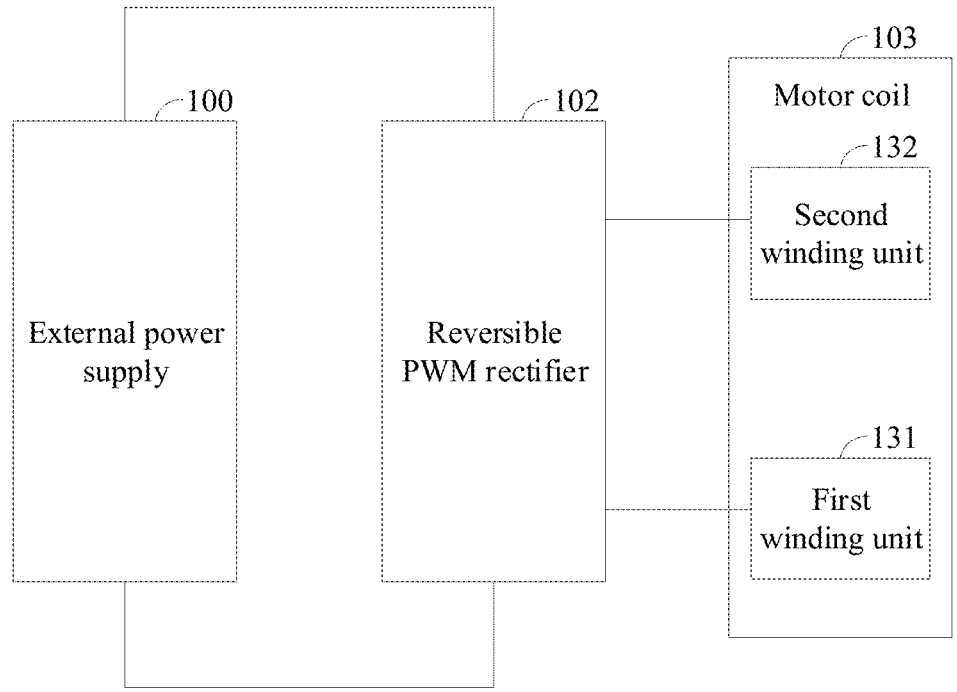
FIG. 1 is a schematic structural diagram of an energy conversion device according to an embodiment of the disclosure.
Figure 2:
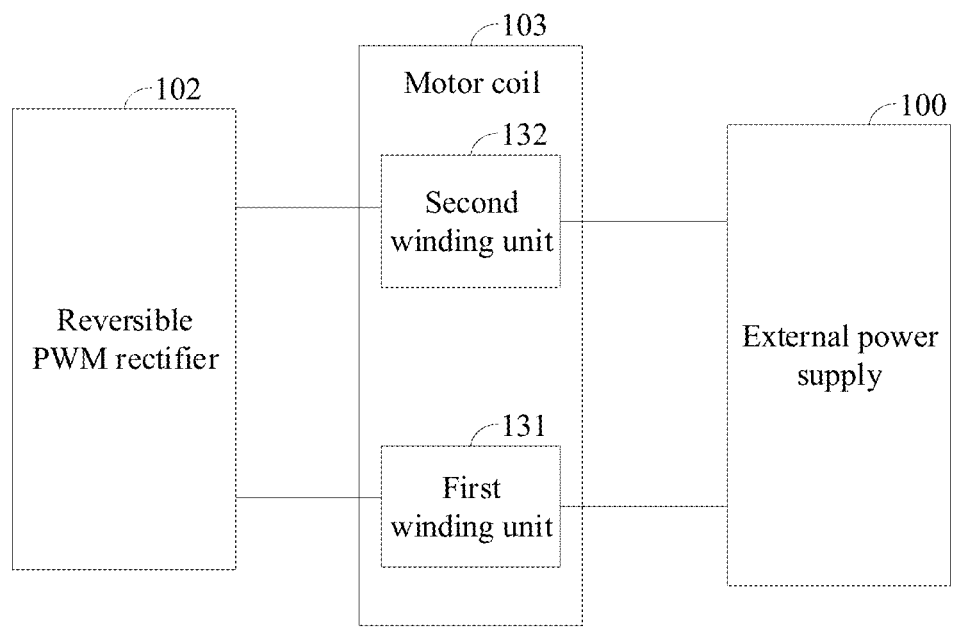
FIG. 2 is another schematic structural diagram of an energy conversion device according to an embodiment of the disclosure.

Embodiment I of the disclosure provides an energy conversion device. As shown in FIG. 1 and FIG. 2, the energy conversion device includes a reversible pulse-width modulation (PWM) rectifier 102 and a motor coil 103. The motor coil 103 includes L sets of winding units, and each set of windings is connected with the reversible PWM rectifier 102, where L≥2 and is a positive integer.

At least two sets of heating circuits for a to-be-heated device are formed by an external power supply 100, the reversible PWM rectifier 102, and the winding units in the motor coil 103.

The energy conversion device controls the reversible PWM rectifier 102 according to an external signal so that a current outputted from the external power supply 100 flows through at least two sets of winding units of the motor coil 103 to generate heat, and a vector sum of resultant current vectors of the at least two sets of the winding units on a quadrature axis of a synchronous rotating reference frame based on motor rotor field orientation is zero. A heating power generated by an $x^{th}$ set of winding unit is $$\frac{m_x}{2} Rs_x (i_{sx}^*)^2 \cdot m_x$$

represents a winding phase number of the $x^{th}$ set of the winding unit, $Rs_x$ represents a phase resistance of each phase winding of the $x^{th}$ set of the winding unit, and $i^*_{sx}$ represents a resultant current vector of a direct axis current and a quadrature axis current of the $x^{th}$ set of the winding unit in the synchronous rotating reference frame, where L≥x≥1, and x is a positive integer.

The motor may be a synchronous motor (including a brushless synchronous motor) or an asynchronous motor. A number of phases of the motor coil 103 is 2 or more, and a number of sets of motor windings is 2 or more (such as a two-phase motor, a three-phase motor, a six-phase motor, a nine-phase motor, a fifteen-phase motor, and the like). A neutral point is formed by connection points of the motor coil 103, and the neutral line is led out from the neutral point. A plurality of neutral lines of the motor coil 103 may be led out. A specific number of connection points of the motor coil 103 depends on a parallel structure of internal windings of the motor. A number of parallel connection points of the motor coil 103 inside the motor and the number of the neutral line led out from neutral point which is formed by the connection points are determined by the actual use of the solution. The motor coil 103 includes L sets of winding units, and each set of windings is connected with the reversible PWM rectifier 102, where L≥2 and is a positive integer. That is to say, at least a first winding unit 131 and a second winding unit 132 are formed by some or all of coil branches of the motor coil 103. The first winding unit 131 is a first set of windings, the second winding unit 132 is a second set of windings, and a $L^{th}$ winding unit is a $L^{th}$ set of windings. The first winding unit 131 includes at least two phase endpoints and at least one neutral point. The second winding unit 132 includes at least two phase endpoints and at least one neutral point. The first winding unit 131 and the second winding unit 132 have different phase endpoints, and the first winding unit 131 and the second winding unit 132 are both connected with the reversible PWM rectifier 102 through the phase endpoints. A neutral line may be led out from the neutral point of the first winding unit 131, or the neutral point may be in a floating state. A neutral line may be led out from the neutral point of the second winding unit 132, or the neutral point may be in the floating state. In addition, all phase windings of each set of the winding unit are used as a basic unit, and the motor vector control for each basic unit can be used to control the motor independently. The PWM in the reversible PWM rectifier 102 is pulse width modulation. The reversible PWM rectifier 102 includes a plurality of phase bridge arms. A number of the bridge arms is configured according to the number of phases of the motor coil 103. Each phase inverter bridge arm includes two power switch units. The power switch unit may be a device such as a transistor, an Insulated Gate Bipolar Transistor (IGBT), a metal—oxide—semiconductor field-effect transistor (MOSFET), a SiC transistor, or the like. The connection points of the two power switch units in the bridge arm are connected with a one of phase coils of the motor, and the power switch unit in the reversible PWM rectifier 102 may be turned on and off according to an external control signal.

Figure 3:
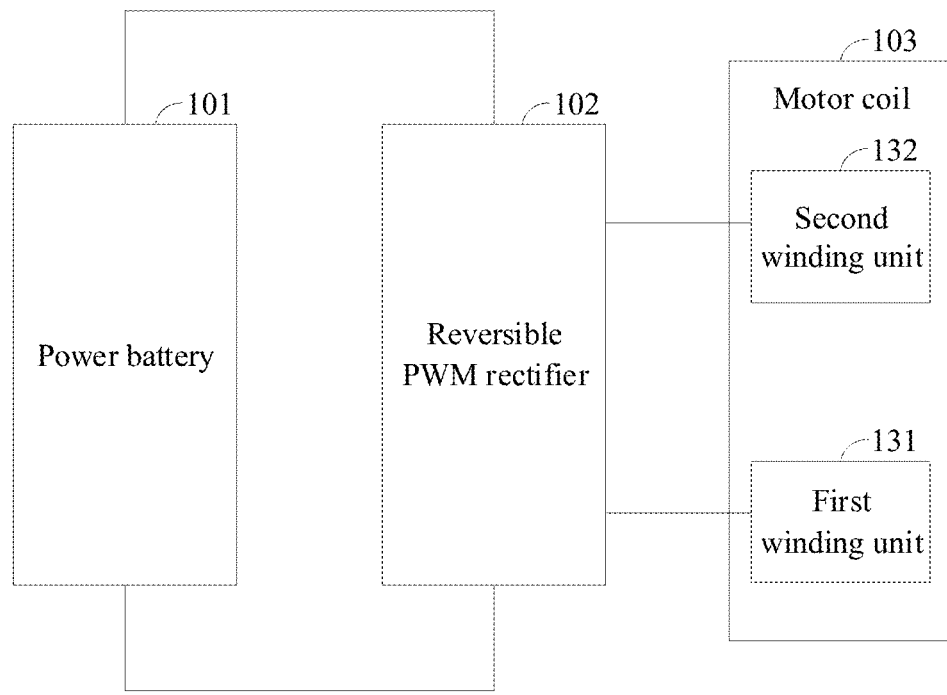
FIG. 3 is another schematic structural diagram of an energy conversion device according to an embodiment of the disclosure.
Figure 4:
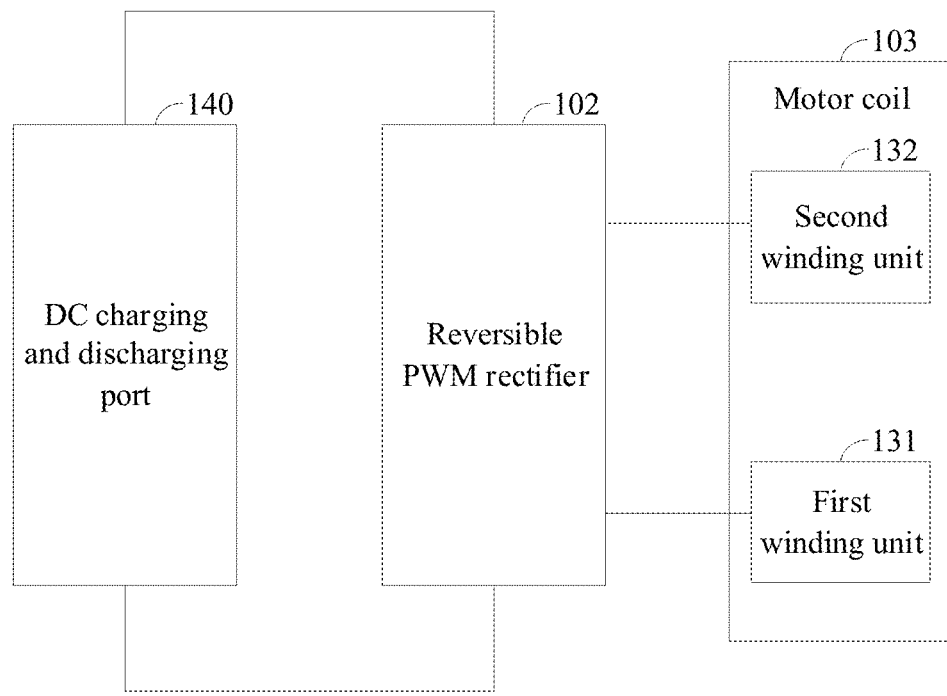
FIG. 4 is another schematic structural diagram of an energy conversion device according to an embodiment of the disclosure.
Figure 5:
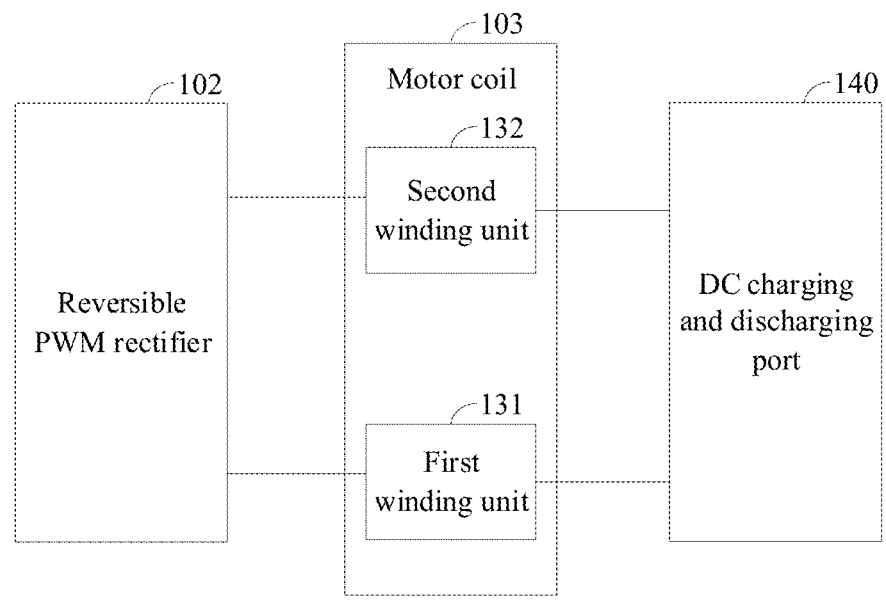
FIG. 5 is another schematic structural diagram of an energy conversion device according to an embodiment of the disclosure.

The at least two sets of heating circuits are formed by the external power supply 100, the reversible PWM rectifier 102, and the winding units in the motor coil 103. The heating circuit formed by the external power supply 100, the reversible PWM rectifier 102, and the motor coil 103 means that the current outputted from the external power supply 100 flows through the motor coil 103 by the reversible PWM rectifier 102 to generate heat, so that the heating circuit is formed. The winding units in the motor coil 103 include at least the first winding unit 131 and the second winding unit 132. A first heating circuit is formed by the external power supply 100, the reversible PWM rectifier 102, and the first winding unit 131. The current outputted from the external power supply 100 flows through the first winding unit 131 to generate heat by the reversible PWM rectifier 102, so that the first heating circuit is formed. A second heating circuit is formed by the external power supply 100, the reversible PWM rectifier 102, and the second winding unit 132. The current outputted from the external power supply 100 flows through the second winding unit 132 to generate heat by the reversible PWM rectifier 102, so that the second heating circuit is formed. The external power supply 100 may be a power supply in a vehicle, for example, a power battery, or the like. The external power supply 100 may also be connected with an external power supply device such as a charging pile by using a charging and discharging port. The first heating circuit and the second heating circuit may be implemented in various ways. For example, as shown in FIG. 3, when the external power supply 100 is a power battery 101, the first heating circuit is formed by the power battery 101, the reversible PWM rectifier 102, and the first winding unit 131, and the second heating circuit is formed by the power battery 101, the reversible PWM rectifier 102, and the second winding unit 132. As shown in FIG. 2, the external power supply 100 may further be connected with an external power supply device by using a DC charging and discharging port to form the first heating circuit and the second heating circuit. For example, as shown in FIG. 4, the DC charging and discharging port 140 may be connected with the reversible PWM rectifier 102. The first heating circuit is formed by the DC charging and discharging port 140, the reversible PWM rectifier 102 and the first winding unit 131, and the second heating circuit is formed by the DC charging and discharging port 140, the reversible PWM rectifier 102, and the second winding unit 132. As shown in FIG. 5, the DC charging and discharging port 140 may be connected with the neutral lines of the first winding unit 131 and the second winding unit 132. The first heating circuit is formed by the DC charging and discharging port 140, the first winding unit 131 and the reversible PWM rectifier 102. The second heating circuit is formed by the DC charging and discharging port 140, the second winding unit 132, and the reversible PWM rectifier 102.

The energy conversion device includes a controller. The controller is connected with the reversible PWM rectifier 102 and transmits a control signal to the reversible PWM rectifier 102. The controller may include a vehicle controller, a control circuit of the reversible PWM rectifier 102, and a battery management system (BMS) circuit. The vehicle controller, the control circuit, and the BMS circuit are connected by using a CAN line. Different modules in the controller control the turn-on and turn-off of the power switch units in the reversible PWM rectifier 102 according to acquired information to realize the connection of different current circuits. The controller transmits the control signal to the reversible PWM rectifier 102 of the energy conversion device, so that the current outputted from the external power supply 100 flows through the at least two sets of the winding units in the motor coil 103 to generate heat, to heat a cooling liquid in the cooling tube flowing through the motor coil 103. The power battery 101 is heated when the cooling liquid flows through the power battery 101.

The causes, According to the external control signal, the energy conversion device make the vector sum of the resultant current vectors of the at least two sets of the winding units on the quadrature axis of the synchronous rotating reference frame based on the rotor field orientation of the motor zero. This means that a resultant current vector is formed by the quadrature axis current and the direct axis current of each set of the winding unit in the synchronous rotating reference frame, and the vector sum on the quadrature axis is the vector sum of all resultant current vectors on the quadrature axis. The energy conversion device controls a magnitude and a direction of the resultant current vector of each set of the winding unit in the synchronous rotating reference frame according to the external control signal, so that a sum of all of the resultant current vectors on the quadrature axis is zero. At this time, the motor in the energy conversion device does not output torque.

The technical effects of the energy conversion device according to the embodiments of the disclosure are as follows. When the energy conversion device is connected with the external power supply 100, at least two sets of heating circuits to be formed by the external power supply 100, the reversible PWM rectifier 102, and the winding units in the motor coil 103 by using the energy conversion device which includes the reversible PWM rectifier 102 and the motor coil 103. The current outputted from the external power supply 100 flows through the at least two sets of the winding units in the motor coil 103 to generate heat by controlling the reversible PWM rectifier 102. The vector sum of the resultant current vectors of the at least two sets of the winding units on the quadrature axis of the synchronous rotating reference frame is zero, And the motor in the energy conversion device does not to output torque, and the current outputted from the external power supply 100 flows through the at least two sets of winding units in the motor coil 103 to generate heat, to heat the cooling liquid in the cooling tube flowing through the motor coil 103. The power battery 101 is heated when the cooling liquid flows through the power battery 101. In this way, an additional power battery heating device can be omitted, and the costs of the entire device can be reduced. In addition, at least two sets of heating circuits are formed by at least two sets of the winding units, so that the heating power is high, and the heating speed is fast. Moreover, the two sets of the winding units are used for heating, so that the heating power is higher and the heating power of each set of windings is lower than the heating power of each set of windings when only one set of windings is used for heating, so as to extend the service life.

In a first embodiment, when L1 sets of the winding units in the L sets of the winding units operate in the heating circuits, the L1 sets of the winding units correspond to L1 resultant current vectors, and $$\frac{L1}{2}$$

pairs of resultant current vectors are formed. Amplitudes of two resultant current vectors of each pair of the resultant current vectors are equal, and each pair of the resultant current vectors are symmetrical with respect to a direct axis of the synchronous rotating reference frame, where L≥L1≥2, and L1 is an even number.

The L1 sets of the winding units in the L sets of the winding units operating in the heating circuit means that when the reversible PWM rectifier 102 of the energy conversion device makes the power switch unit of the reversible PWM rectifier operate according to the control signal, the current outputted from the external power supply 100 is caused to flow through the L1 sets of the winding units through the reversible PWM rectifier 102. The L1 sets of winding units correspond to one synchronous rotating reference frame based on the rotor field orientation of the motor. The L1 sets of the winding units simultaneously correspond to the L1 resultant current vectors. When L1 is an even number, $$\frac{L1}{2}$$

pairs of resultant current vectors may be formed. Since each pair of the resultant current vectors is controlled to be symmetrical with respect to the direct axis of the synchronous rotating reference frame, and the amplitudes of the two resultant current vectors in each pair of the resultant current vectors are equal, components of each pair of the resultant current vectors on the quadrature axis of the synchronous rotating reference frame based on the rotor field orientation of the motor can cancel each other. In this way, the vector sum of the resultant current vectors of the at least two sets of the winding units on the quadrature axis of the synchronous rotating reference frame is zero, so that the motor in the energy conversion device does not output torque.

It should be noted that, in this embodiment, angles between the currents in the synchronous rotating reference frame based on the rotor field orientation of the motor and the direct axis are all electrical angles.

In a second embodiment, when L1 sets of the winding units in the L sets of the winding units operate in the heating circuits, the L1 sets of the winding units correspond to L1 resultant current vectors, and $$\frac{L1}{2}$$

pairs of the resultant current vectors are formed. Amplitudes of two resultant current vectors in each pair of the resultant current vectors are equal, at least one pair of the resultant current vectors are symmetrical with respect to a direct axis of the synchronous rotating reference frame, and electrical angles of two resultant current vectors in at least one pair of the resultant current vectors differ by 180°, where L≥L1≥2, and L1 is an even number.

A difference between this embodiment and the first embodiment is that in addition to at least one pair of the resultant current vectors being symmetrical with respect to the direct axis of the synchronous rotating reference frame, the electrical angles of two resultant current vectors in at least one pair of the resultant current vectors differ by 180°. Since the amplitudes of the two resultant current vectors in each pair of the resultant current vectors are equal, the resultant current vectors have the same magnitude of amplitudes and opposite directions. That is to say, the sum of each pair of the resultant current vectors symmetrical with respect to the center is 0, and then components of $$\frac{L1}{2}$$

pairs of resultant current vectors on the quadrature axis of the synchronous rotating reference frame based on the rotor field orientation of the motor may cancel each other. In this way, the vector sum of the resultant current vectors of the at least two sets of winding units on the quadrature axis of the synchronous rotating reference frame is zero, so that the motor of the energy conversion device does not output torque. In addition, when a pair of resultant current vectors are symmetrical with respect to the direct axis of the synchronous rotating reference frame, and when an angle of one of the resultant current vectors with respect to the direct axis of the synchronous rotating reference frame is a, it is known that an angle of the other of the pair of resultant current vectors with respect to the direct axis of the synchronous rotating reference frame is 360-α. When the angles between the two resultant current vectors and the direct axis differ by 180 degrees, and when the angle between one of each pair of the resultant current vectors and the direct axis is acquired, the angle between the other resultant current vector and the direct axis can be obtained, and component values of the resultant current vectors on the direct axis and the quadrature axis may be obtained by using the angle and the amplitude of the resultant current vector.

In a third embodiment, when L2 sets of the winding units in the L sets of the winding units operate in the heating circuits, the L2 sets of the winding units correspond to L2 resultant current vectors, and $$\frac{L2-1}{2}$$

pairs of the resultant current vectors and a first resultant current vector are formed. The amplitudes of the two resultant current vectors in each pair of the resultant current vectors are equal, each pair of the resultant current vectors are symmetrical with respect to a direct axis of the synchronous rotating reference frame, and the first resultant current vector is located on the direct axis of the synchronous rotating reference frame, where L≥L2≥3, and L2 is an odd number.

The L2 sets of winding units in the L sets of winding units operating in the heating circuit means that when the reversible PWM rectifier 102 of the energy conversion device makes the power switch unit in the reversible PWM rectifier operate according to the control signal, the current outputted from the external power supply 100 is caused to flow through the L2 sets of the winding units through the reversible PWM rectifier 102. The L2 sets of the winding units correspond to one synchronous rotating reference frame based on the rotor field orientation of the motor. The L2 sets of the winding units simultaneously correspond to the L2 resultant current vectors. When L2 is an odd number, L2 includes a first resultant current vector and L2-1 resultant current vectors. When L2-1 is an even number, $$\frac{L2-1}{2}$$

pairs of the resultant current vectors may be formed. Since each pair of the resultant current vectors are controlled to be symmetrical with respect to the direct axis of the synchronous rotating reference frame with respect to the direct axis of the synchronous rotating reference frame, and the amplitudes of the two resultant current vectors in each pair of the resultant current vectors are equal, components of each pair of the resultant current vectors on the quadrature axis of the synchronous rotating reference frame based on the rotor field orientation of the motor may cancel each other. In addition, the first resultant current vector is located on the direct axis of the synchronous rotating reference frame. In this way, the vector sum of the resultant current vectors of the at least two sets of the winding units on the quadrature axis of the synchronous rotating reference frame based on the rotor field orientation of the motor is zero, so that the motor in the energy conversion device does not output torque.

In a fourth embodiment, when the L2 sets of the winding units in the L sets of the winding units operate in the heating circuits, the L2 sets of the winding units correspond to L2 resultant current vectors, and $$\frac{L2-1}{2}$$

pairs of resultant current vectors and the first resultant current vector are formed. At least one pair of the resultant current vectors are symmetrical with respect to the direct axis of the synchronous rotating reference frame. The amplitudes of two resultant current vectors in each pair of the resultant current vectors are equal, and the angles of two resultant current vectors in at least one pair of the resultant current vectors differ by 180°. The first resultant current vector is located on the direct axis of the synchronous rotating reference frame, where L≥L2≥3, and L2 is an odd number.

A difference between this embodiment and the third embodiment is that in addition to at least one pair of the resultant current vectors being symmetrical with respect to the direct axis of the synchronous rotating reference frame, the angles of two resultant current vectors in at least one pair of the resultant current vectors differ by 180°. Since the resultant current vectors have the same magnitude of amplitudes and opposite directions, that is, the sum of the two resultant current vectors whose angles differ by 180° is 0, and then components of $$\frac{L2-1}{2}$$

pairs of resultant current vectors on the quadrature axis of the synchronous rotating reference frame based on the rotor field orientation of the motor may cancel each other. In addition, the first resultant current vector is located on the direct axis of the synchronous rotating reference frame. In this way, the vector sum of the resultant current vectors of the at least two sets of winding units on the quadrature axis of the synchronous rotating reference frame based on the rotor field orientation of the motor is zero, so that the motor in the energy conversion device does not output torque. In addition, when a pair of the resultant current vectors are symmetrical with respect to the direct axis of the synchronous rotating reference frame, and when an angle of one of the resultant current vectors with respect to the direct axis of the synchronous rotating reference frame is a, it is known that an angle of the other of the pair of resultant current vectors with respect to the direct axis of the synchronous rotating reference frame is −α. When the resultant current vectors are central symmetrical with respect to, it is known that the angles between the two resultant current vectors and the direct axis differ by 180 degrees. When the angle between one of each pair of the resultant current vectors and the direct axis is acquired, the angle between the other resultant current vector and the direct axis can be obtained, and component values of the resultant current vectors on the direct axis and the quadrature axis may be obtained by using the angle and the amplitude of the resultant current vector.

In a fifth embodiment, when L3 sets of the winding units in the L sets of the winding units operate in the heating circuits, the L3 sets of the winding units correspond to L3 resultant current vectors, and $$\frac{L3-1}{2}$$

pairs of the resultant current vectors and a second resultant current vector are formed. Amplitudes of two resultant current vectors in each pair of the resultant current vectors are equal, and angles of the two resultant current vectors in each pair of the resultant current vectors differ by 180°. The second resultant current vector is located on the direct axis of the synchronous rotating reference frame, where L≥L3≥3; and L3 is an odd number.

The L3 sets of the winding units in the L sets of the winding units operating in the heating circuit means that when the reversible PWM rectifier 102 of the energy conversion device makes the power switch unit in the reversible PWM rectifier operate according to the control signal, the current outputted from the external power supply 100 is caused to flow through the L3 sets of the winding units by using the reversible PWM rectifier 102. The L3 sets of winding units correspond to one synchronous rotating reference frame based on the rotor field orientation of the motor. The L3 sets of winding units simultaneously correspond to the L3 resultant current vectors. When L3 is an odd number, L3 includes a second resultant current vector and L3-1 resultant current vectors. When L3-1 is an even number, $$\frac{L3-1}{2}$$

pairs of the resultant current vectors may be formed. Since the angles of the two resultant current vectors in each pair of the resultant current vectors differ by 180°, and the amplitudes of two resultant current vectors in each pair of the resultant current vectors are equal, the resultant current vectors may be caused to have the same magnitude of the amplitudes and opposite directions. That is to say, the sum of the resultant current vectors whose angles differ by 180° is zero, and then components of the $$\frac{L3-1}{2}$$

pairs of resultant current vectors on the quadrature axis of the synchronous rotating reference frame based on the rotor field orientation of the motor may cancel each other. In addition, the second resultant current vector is located on the direct axis of the synchronous rotating reference frame. In this way, the vector sum of the resultant current vectors of the at least two sets of the winding units on the quadrature axis of the synchronous rotating reference frame based on the rotor field orientation of the motor is zero, so that the motor in the energy conversion device does not output torque.

For the angle between each resultant current vector and the direct axis in the synchronous rotating reference frame, in an embodiment, the angles of the resultant current vectors of each of the L sets of the winding units with respect to the direct axis of the synchronous rotating reference frame are fixed values.

Since angles of the resultant current vectors of each set of the winding unit with respect to the direct axis of the synchronous rotating reference frame are fixed values, and the resultant current vectors of each of the L sets of the winding units can be divided into a plurality of pairs of resultant current vectors, each pair of the resultant current vectors are symmetrical with respect to the direct axis or an origin of the synchronous rotating reference frame. The angle of one of the pair of resultant current vectors with respect to the direct axis in the synchronous rotating reference frame can be acquired, the angle of the other of the resultant current vectors with respect to the direct axis in the synchronous rotating reference frame can be acquired, and then the components of each resultant current vector on the direct axis and the quadrature axis can be acquired. In this way, each pair of the resultant current vectors on the quadrature axis of the synchronous rotating reference frame based on the rotor field orientation of the motor may cancel each other out, so that the vector sum of the resultant current vectors of the at least two sets of the winding units on the quadrature axis of the synchronous rotating reference frame based on the rotor field orientation of the motor is zero.

For the angle between each resultant current vector and the direct axis in the synchronous rotating reference frame, in an embodiment, the angles of the resultant current vectors of each of the L sets of the winding units with respect to the direct axis in the synchronous rotating reference frame are variable values.

Changes in the angles of the resultant current vectors of each of the L sets of the winding units with respect to the direct axis in the synchronous rotating reference frame may be changed according to a preset rule, and the angles may vary within a certain range by setting an angle variation formula, for example, vary within a range of 0 degrees to 360 degrees.

Compared with the above embodiment, in this embodiment, the angles of the resultant current vectors of each set of the winding unit with respect to the direct axis in the synchronous rotating reference frame are controlled to be variable values, so as to adjust the current on each phase coil in each set of the winding unit to be a variable value. Heat dissipated on each phase coil is adjusted. In addition, currents of the power switch units flowing through upper and lower bridge arms of each phase bridge arm in the reversible PWM rectifier 102 are equalized, thereby extending the service life of the power switch unit in each phase bridge arm.

In an embodiment, when each pair of the resultant current vectors are symmetrical with respect to the direct axis of the synchronous rotating reference frame, the angles of the resultant current vectors of at least one pair of the winding units of the L sets of winding units with respect to the direct axis in the synchronous rotating reference frame are variable values. An angle of one of the pair of resultant current vectors with respect to the direct axis in the synchronous rotating reference frame is $\theta_{L/2\text{-}1}=2\pi f_1 t+\theta_{L/2\text{-}0}$, and an angle of the other of the resultant current vectors with respect to the direct axis in the synchronous rotating reference frame is $\theta_{L/2\text{-}2}=-\theta_{L/2\text{-}1}$. The f1 is a change frequency of the angle of the resultant current vector with respect to the direct axis of the synchronous rotating reference frame. The $\theta_{L/2\text{-}0}$ is an initial angle of the angle of one of the pair of resultant current vectors with respect to the direct axis in the synchronous rotating reference frame, and t is a time.

In an embodiment, when the angles of two resultant current vectors in each pair of the resultant current vectors differ by 180°, the angles of the resultant current vectors of at least one pair of the winding units of the L sets of winding units with respect to the direct axis in the synchronous rotating reference frame are variable values. An angle of one of the pair of resultant current vectors with respect to the direct axis in the synchronous rotating reference frame is $\theta_{L/2\text{-}1}=2\pi f_1 t+\theta_{L/2\text{-}0}$, and an angle of the other of the resultant current vectors with respect to the direct axis in the synchronous rotating reference frame is $\theta_{L/2\text{-}2}=2\pi f_1 t+180+\theta_{L/2\text{-}0}$. The $f_1$ is a change frequency of the angle of the resultant current vector with respect to the direct axis of the synchronous rotating reference frame. The $\theta_{L/2\text{-}0}$ is an initial angle of the angle of one of the pair of resultant current vectors with respect to the direct axis in the synchronous rotating reference frame, and t is a time.

In the above two embodiments, since the angle between two winding units in a pair of the winding units is a fixed value, when an angle between the resultant current vector of one winding unit and a positive direction of the direct axis in the synchronous rotating reference frame is a variable value, an angle between the resultant current vector of the other winding unit and the positive direction of the direct axis in the synchronous rotating reference frame is also a variable value, so that the resultant current vector of each winding unit rotates according to the preset direction. The current of each phase coil in each winding unit varies sinusoidally and has the same amplitude. Each phase coil in each winding unit performs heating evenly, to cause each set of the winding unit to perform heating completely evenly, and the temperatures of the motor winding and each permanent magnet are even. In this way, the problem that the permanent magnet of the motor is prone to demagnetization due to the uneven heating temperature of some motors made of low-performance magnetic materials in the motor winding and each permanent magnet can be avoided.

In addition, different impedance of the battery at different frequencies is used by adjusting the change frequency, so that the greater impedance leads to greater heating. When the external power supply is the battery, the heating of the battery itself may be increased. According to heating power requirements at different temperatures of the battery, an appropriate amplitude and the change frequency of the electrical angle are selected, to facilitate system regulation and response.

For the amplitude of the resultant current vector, in an embodiment, the angles of the L1 resultant current vectors with respect to the direct axis in the synchronous rotating reference frame are fixed values, and the L1 resultant current vectors have the same amplitude.

The amplitude of each resultant current vector is set as the fixed value, so that the components of the amplitudes of the L1 resultant current vectors on the direct axis and the quadrature axis may cancel each other.

For the amplitude of the resultant current vector, in another embodiment, the angles of each set of the resultant current vectors with respect to the direct axis in the synchronous rotating reference frame are fixed values, the amplitudes of at least one pair of resultant current vectors are equal and are variable values, and each of the amplitudes of the at least one pair of resultant current vectors is $\sqrt{2}|i^*_s|\sin(2\pi f_2)$. The $f_2$ is the change frequency of each of the amplitudes of the current vectors, and the $\sqrt{2}|i^*_s|$ is is a maximum amplitude of the resultant current vectors.

Compared with the above embodiment, in this embodiment, the amplitude of the resultant current vector is adjusted to vary sinusoidally, so that currents of the power device (such as a diode) flowing through the upper and lower bridge arms in the PWM rectifier are equalized, and the service life of the power device is equalized. Although the amplitudes of the resultant current vector of each phase winding current are not exactly the same, a sinusoidally varying signal of each phase current can cause each phase winding of each set of windings to be heated more evenly. In addition, the change frequency $f_2$ of the amplitude of the resultant current vector is adjusted, and the change frequency $f_2$ is limited to be less than a carrier frequency of the system, that is, less than the switching frequency of the PWM rectifier. In this way, increase the heat generation of the battery by utilizing the different impedance of the battery at different frequency, the larger the impedance, the larger the heat generation.

In an implementation, the energy conversion device includes a controller. The controller is connected with the reversible PWM rectifier 102 and is configured to:

acquire, according to an external control signal, a target heating power that needs to be generated by the motor coil 103;

obtain a target resultant current vector of each set of the winding unit according to the target heating power;

acquire a target direct axis current and a target quadrature axis current of each set of the winding unit respectively on a direct axis and a quadrature axis of the synchronous rotating reference frame according to the target resultant current vector; and acquire an actual direct axis current and an actual quadrature axis current of each set of the winding unit respectively on the direct axis and the quadrature axis of the synchronous rotating reference frame, and acquire a duty cycle of bridge arms of the reversible PWM rectifier 102 connected with each set of the winding unit according to the target quadrature axis current, the target direct axis current, the actual quadrature axis current, and the actual direct axis current.

The obtaining a target resultant current vector of each set of the winding unit according to the target heating power includes:

obtaining a target resultant current vector of each set of the winding unit according to the following formula:

$$P = \frac{m}{2}nR_s(i^*_s)^2 = \frac{m}{2}R_s\left[(i^*_{s1})^2 + (i^*_{s2})^2 + \ldots + (i^*_{sn})^2\right]$$

where P is the target heating power, $R_s$ is a phase resistance of each phase winding of an $n^{th}$ set of the winding unit operating in the heating circuit, $i^*_{sn}$ is the resultant current vector of currents of the $n^{th}$ set of winding unit on the direct axis and the quadrature axis, and m is a number of phases of the bridge arms of the reversible PWM rectifier 102;

obtaining the amplitude of the target resultant current vector of each set of the winding unit according to the target heating power and the above formula, acquiring the target direct axis current and the target quadrature axis current of each set of the winding unit on the direct axis and the quadrature axis of the synchronous rotating reference frame respectively according to the amplitude and the electrical angle of the target resultant current vector of each set of the winding unit, and then acquiring the actual quadrature axis current and the actual direct axis current of each set of winding unit according to a sampling current value and the rotor electrical angle of each set of winding unit; and then performing closed-loop control on the actual quadrature axis current and the target quadrature axis current of each set of winding unit to obtain a first target voltage difference, performing closed-loop control on the actual direct axis current and the target direct axis current of each set of winding unit to obtain a second target voltage difference, and then obtaining a duty cycle of m phase bridge arms of the reversible PWM rectifier 102 by performing inverse Park transformation on the first target voltage difference and the second target voltage difference and transmitting to a space vector pulse-width-modulation (SVPWM) algorithm.

In this embodiment, the duty cycle of the m phase bridge arms is outputted to the reversible PWM rectifier 102 by the controller. In this way, the external power supply may be controlled to output currents to the winding units of the motor coil 103 to flow through at least two sets of winding units of the motor coil 103 to output the target heating power.

In an embodiment, when the external power supply is the power battery 101, the power battery 101 outputs a current to the energy conversion device to make the motor coil 103 output the target heating power.

At least two sets of heating circuits are formed by the power battery 101, the reversible PWM rectifier 102, and the winding units in the motor coil 103.

Figure 6:
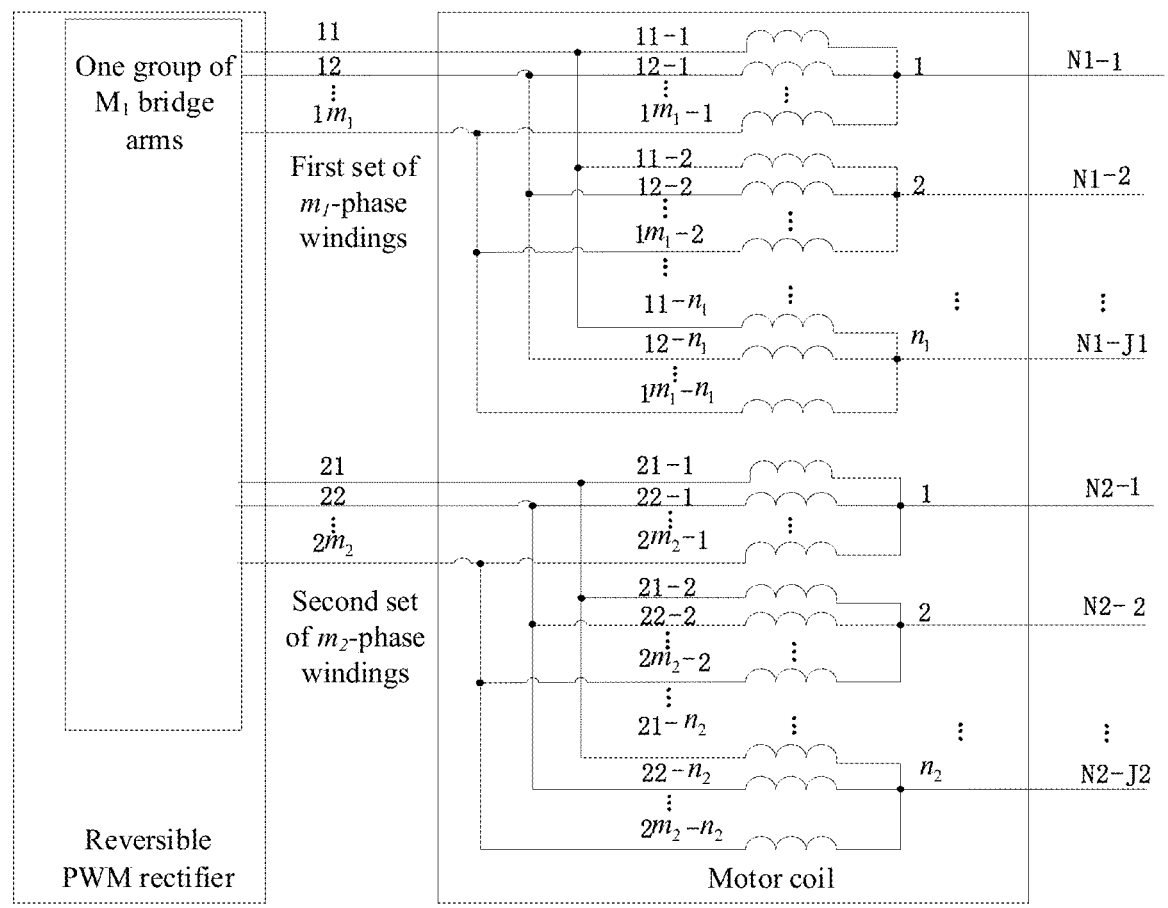
FIG. 6 is a schematic structural diagram of a motor coil in an energy conversion device according to an embodiment of the disclosure.

As shown in FIG. 6, the reversible PWM rectifier 102 includes a group of $M_1$ bridge arms. A first bus terminal and a second bus terminal are formed by the $M_1$ bridge arms. A positive terminal and a negative terminal of the power battery 101 are respectively connected with the first bus terminal and the second bus terminal. The motor coil 103 includes a first winding unit 131 and a second winding unit 132.

The first winding unit 131 includes a set of $m_1$ phase windings. Each of the $m_1$ phase windings includes $n_1$ coil branches. The $n_1$ coil branches of each phase winding are connected together to form a phase endpoint. The phase endpoints of the $m_1$ phase windings are connected in a one-to-one correspondence with midpoints of each of $m_1$ bridge arms of the $M_1$ bridge arms. One of the $n_1$ coil branches of each of the $m_1$ phase windings is further connected with one of the $n_1$ coil branches of other phase windings of the $m_1$ phase windings to form $n_1$ connection points, where $m_1 \geq 2$, $n_1 \geq 1$, $n_1$ and $m_1$ are both integers.

The second winding unit 132 includes a set of $m_2$ phase windings. Each of the $m_2$ phase windings includes $n_2$ coil branches. The $n_2$ coil branches of each phase winding are connected together to form a phase endpoint. The phase endpoints of the $m_2$ phase windings are connected in a one-to-one correspondence with midpoints of each of $m_2$ bridge arms of the $M_1$ bridge arms. One of the $n_2$ coil branches of each of the $m_2$ phase windings is further connected with one of the $n_2$ coil branches of other phase windings of the $m_2$ phase windings to form $n_2$ connection points, where $m_2 \geq 2$, $M_1 \geq m_1+m_2$, $n_{2>1}$, and $n_2$, $m_2$, and $M_1$ are all integers.

A first heating circuit is formed by the power battery 101, the reversible PWM rectifier 102, and the first winding unit 131, and a second heating circuit is formed by the power battery 101, the reversible PWM rectifier 102, and the second winding unit 132.

In this embodiment, the reversible PWM rectifier 102 is controlled according to the external control signal, to cause the current outputted from the power battery 101 to flow through the first winding unit 131 and the second winding unit 132 to generate heat, and cause the vector sum of the resultant current vectors of the first winding unit 131 and the second winding unit 132 on the quadrature axis of the synchronous rotating reference frame based on the rotor field orientation of the motor to be zero. In this way, the energy conversion device generates heat and does not output torque, and two sets of the winding units are used for performing heating, so that the heating power is higher and the heating power of each set of windings is lower than the heating power of each set of windings when only one set of windings is used for heating, so as to extend the service life.

In another embodiment, at least two sets of heating circuits are formed by an external DC charging and discharging port, the winding units in the motor coil 103, and the reversible PWM rectifier 102. The external DC charging and discharging port is connected with at least one neutral line led out from the motor coil 103.

The external power supply 100 is a DC power supply device, and the DC power supply device is connected with the external DC charging and discharging port.

The reversible PWM rectifier 102 includes a group of $M_1$ bridge arms, and the motor coil 103 includes a first winding unit 131 and a second winding unit 132.

As shown in FIG. 6, the first winding unit 131 includes a set of $m_1$ phase windings, and each of the $m_1$ phase windings includes $n_1$ coil branches. The $n_1$ coil branches of each phase winding are connected together to form a phase endpoint. The phase endpoints of the $m_1$ phase windings are connected in a one-to-one correspondence with midpoints of each of $m_1$ bridge arms of the $M_1$ bridge arms. One of the $n_1$ coil branches of each of the $m_1$ phase windings is further connected with one of the $n_1$ coil branches of other phase windings of the $m_1$ phase windings to form $n_1$ connection points. $T_1$ neutral points are formed by the $n_1$ connection points. A first neutral line is led out from $T_1$ neutral points, and $J_1$ neutral lines are led out from the $T_1$ neutral points, where $n_1 \geq T_1 \geq 1$, $T_1 \geq J_1 \geq 1$, $m_1 \geq 2$, and $n_1$, $m_1$, $T_1$, and $J_1$ are all positive integers.

The second winding unit 132 includes a set of $m_2$-phase windings. Each of the $m_2$-phase windings includes $n_2$ coil branches. The $n_2$ coil branches of each phase winding are connected together to form a phase endpoint. The phase endpoints of the $m_2$-phase windings are connected in a one-to-one correspondence with midpoints of each of $m_2$ bridge arms of the $M_1$ bridge arms. One of the $n_2$ coil branches of each of the $m_2$-phase windings is further connected with one of the $n_2$ coil branches of other phase windings of the $m_2$-phase windings to form $n_2$ connection points. $T_2$ neutral points are formed by the $n_2$ connection points. A second neutral line is led out from $T_2$ neutral points, and $J_2$ neutral lines are led out from the $T_2$ neutral points, where $n_2 \geq T_2 \geq 1$, $T_2 \geq J_2 \geq 1$, $m_2 \geq 2$, $M_1 \geq m_1+m_2$, and $n_2$, $m_2$, $T_2$, and $J_2$ are all positive integers.

A third heating circuit is formed by the DC power supply device, the first winding unit 131, and the reversible PWM rectifier 102, and a fourth heating circuit is formed by the DC power supply device, the second winding unit 132, and the reversible PWM rectifier 102.

In this embodiment, the reversible PWM rectifier 102 is controlled according to the external control signal, to cause the current outputted by the DC power supply device to flow through the first winding unit 131 and the second winding unit 132 to generate heat, and cause the vector sum of the resultant current vectors of the first winding unit 131 and the second winding unit 132 on the quadrature axis of the synchronous rotating reference frame based on the rotor field orientation of the motor to be zero. In this way, the energy conversion device generates heat and does not output torque, and when the power of a to-be-heated battery is insufficient, the power can be supplied by the DC power supply device connected with the external DC charging and discharging port.

In another embodiment, the power battery 101 output the current to the energy conversion device, to make the motor coil 103 to generate heat, and at the same time, the DC power supply device charges the power battery 101 by using the energy conversion device.

The external power supply 100 includes a power battery 101 and a DC power supply device. The power battery 101 is connected with the reversible PWM rectifier 102, the external DC charging and discharging port is connected with at least one neutral line led out from the motor coil 103, and the DC power supply device is connected with the external DC charging and discharging port.

At least two sets of heating circuits are formed by the power battery 101, the reversible PWM rectifier 102, and the winding units of the motor coil 103, and a charging circuit is formed by the DC power supply device, the motor coil 103, the reversible PWM rectifier 102, and the power battery 101.

Alternatively, the external power supply 100 is the power battery 101. The power battery 101 is connected with the reversible PWM rectifier 102, the external DC charging and discharging port 140 is connected with the at least one neutral line led out from the motor coil 103, and the external DC charging and discharging port 140 is connected with the DC power supply device.

At least two sets of heating circuits are formed by the power battery 101, the reversible PWM rectifier 102, and the winding units in the motor coil 103, and a discharging circuit is formed by the power battery 101, the reversible PWM rectifier 102, the motor coil 103, and a DC electric device.

The controller is further configured to:

acquire the target heating power that needs to be generated by the motor coil 103 and a target charging power or a target discharging power of the power battery 101;

acquire a target charging current or a target discharging current of each set of the winding unit according to the target charging power or the target discharging power, and acquire a first heating power generated by each set of the winding unit according to the target charging current or the target discharging current;

acquire a second heating power generated by each set of the winding unit according to the target heating power and the first heating power generated by each set of the winding unit;

obtain the target resultant current vector of each set of winding unit according to the second heating power, and acquire a target direct axis current and a target quadrature axis current of each set of the winding unit respectively on the direct axis and the quadrature axis of the synchronous rotating reference frame according to the target resultant current vector;

acquire an actual direct axis current, an actual quadrature axis current, and a zero-axis current of each set of winding unit respectively on the direct axis and the quadrature axis of the synchronous rotating reference frame according to the sampling current value of each set of winding unit, and acquire a first duty cycle ($D_11, D_12, \ldots, D_1m$) of a bridge arm of the reversible PWM rectifier 102 connected with each set of winding unit according to the target quadrature axis current, the target direct axis current, the actual quadrature axis current, and the actual direct axis current;

acquire, according to the target charging current or the target discharging current and the zero-axis current, a duty cycle adjustment value (DO) of the bridge arm of the reversible PWM rectifier 102 connected with each set of winding unit; and acquire the duty cycle (D1, D2, ..., Dm) of each phase bridge arm of the reversible PWM rectifier 102 connected with each set of the winding unit according to the first duty cycle and the duty cycle adjustment value.

A first heating power generated by an $x^{th}$ set of the winding unit is $m_x Rs_{0x}(i^*_{0x})^2$, and a second heating power generated by the $x^{th}$ set of the winding unit is $$\frac{m_x}{2} Rs_x (i^*_{sx})^2 \cdot m_x$$

represents a number of phases of windings of the $x^{th}$ set of the winding unit, $i^*_{ox}$ represents a target current vector formed on the zero axis by a current passing through each phase winding of the $x^{th}$ set of the winding unit, $Rs_{0x}$ represents a phase resistance of each phase coil branch connected with the neutral line of the $x^{th}$ set of winding unit, i represents the resultant current vector of the currents of the $x^{th}$ set of winding unit on the direct axis and the quadrature axis, and Rs, represents a phase resistance of each phase winding branch in the $x^{th}$ set of winding unit.

The target charging current of each set of the winding unit is acquired according to the target charging power, so that the currents flowing through each set of the winding unit are the same. The first heating power generated by each set of winding unit is acquired according to the target charging current. Since a sum of the first heating power and the second heating power is the target heating power, the second heating power generated by each set of winding unit is acquired by subtracting the first heating power generated by each set of winding unit from the target heating power.

The obtaining the target resultant current vector of each set of winding unit according to the second heating power includes:

obtaining a target resultant current vector of each set of the winding unit according to the following formula:

$$P = \frac{m}{2} nR_s(i^*_s)^2 = \frac{m}{2} R_s\left[(i^*_{s1})^2 + (i^*_{s2})^2 + \ldots + (i^*_{sn})^2\right]$$

where P is the target heating power, $R_s$ is a phase resistance of each phase winding of an $n^{th}$ set of the winding unit operating in the heating circuit, $i^{sn}$ is the resultant current vector of currents of the $n^{th}$ set of winding unit on the direct axis and the quadrature axis, and m is a number of phases of the bridge arm in the reversible PWM rectifier 102;

obtaining the amplitude of the target resultant current vector of each set of the winding unit according to the second heating power and the above formula, acquiring the target direct axis current and the target quadrature axis current of each set of the winding unit respectively on the direct axis and the quadrature axis of the synchronous rotating reference frame according to the amplitude and the electrical angle of the target resultant current vector of each set of the winding unit, and then acquiring the actual quadrature axis current and the actual direct axis current of each set of the winding unit according to a sampling current value and the rotor electrical angle of each set of the winding unit; obtaining a first target voltage difference by performing a difference operation on the actual quadrature-axis current and the target quadrature-axis current of each set of the winding unit and then performing a PID (proportional integral derivative) operation, obtaining a second target voltage difference by performing a difference operation on the actual direct axis current and the target direct axis current of each set of the winding unit and then performing PID (proportional integral derivative) operation, obtaining a first duty cycle of m phase bridge arms of the reversible PWM rectifier 102 by performing inverse Park transformation on the first target voltage difference and the second target voltage difference and transmitting to a space vector pulse-width-modulation (SVPWM) algorithm, and calculating the target current value of each set of the winding unit according to the target resultant current vector and a number of motor phases; and multiplying the target charging current or target discharging current of each set of winding unit by $$\frac{1}{m},$$

then performing vector operation with the zero-axis current, and performing PID operation to obtain the duty cycle adjustment value of the bridge arm of the reversible PWM rectifier connected with each set of the winding unit, and acquiring the duty cycle of each phase bridge arm of the reversible PWM rectifier connected with each set of the winding unit according to the first duty cycle and the duty cycle adjustment value. Specifically, the duty cycle of each phase bridge arm is acquired according to the following formula, $D1=D_11+D0, D2=D_12+D0, \ldots,$ and $Dm=D_1m+D0$.

In this embodiment, a total duty cycle is outputted to the reversible PWM rectifier 102 by the controller. In this way, the power battery 101 can be controlled to output the current to the winding units of the motor coil 103 to flow through at least two sets of winding units of the motor coil 103 to output the target heating power, and the DC power supply device can charge the power battery 101 by using the energy conversion device.

The technical effects of this embodiment are as follows. The motor coil 103 and the reversible PWM rectifier 102 are disposed in the energy conversion device, and the charging circuit is formed by the motor coil 103, the reversible PWM rectifier 102, the power battery 101 and the DC power supply device. It is only necessary to control the operating state of the reversible PWM rectifier 102 to adjust the current flowing from the DC power supply device and the power battery 101 to the charging circuit. In this way, the motor coil 103 can be heated while the power battery 101 is charged, a same system is used to charge the battery, and the motor coil 103 consumes power to generate heat. Therefore, the reusability of components and parts is high, the system integration degree is high, and the structure is simple, thereby reducing the system costs and reducing the system volume.

In an embodiment, the energy conversion device further includes a bus capacitor C1, and the motor coil 103 includes a first winding unit 131 and a second winding unit 132. A fifth heating circuit is formed by the bus capacitor, the reversible PWM rectifier 102, and the first winding unit 131. A sixth heating circuit is formed by the bus capacitor, the reversible PWM rectifier 102, and the second winding unit 132. A charging circuit or a discharging circuit is formed by the external DC charging and discharging port and the power battery 101 by the energy conversion device. When the external power supply 100 is the power battery 101 and the DC power supply device, the reversible PWM rectifier 102 further includes a first bus terminal and a second bus terminal. A first end of the external DC charging and discharging port is connected with at least two neutral lines led out from the motor coil 103, a second end of the external DC charging and discharging port is connected with the second bus terminal, the positive terminal of the power battery 101 is connected with the first bus terminal, the negative terminal of the power battery 101 is connected with the second bus terminal, and the external DC charging and discharging port is connected with the DC power supply device. When the external power supply 100 includes the power battery 101 and the DC electric device, the details are not described again.

In this embodiment, the fifth heating circuit and the sixth heating circuit may be formed respectively with the first winding unit 131 and the second winding unit 132 by multiplexing the bus capacitor C1 and the reversible PWM rectifier 102, and the fifth heating circuit and the sixth heating circuit are heated by taking electricity by using the bus capacitor.

In this embodiment, a first charging circuit is formed by the DC power supply device, the first winding unit 131, the reversible PWM rectifier 102, and the power battery 101, and a second charging circuit is formed by the DC power supply device, the second winding unit 132, the reversible PWM rectifier 102, and the power battery 101. The energy conversion device makes the first charging circuit, the first heating circuit, and the second heating circuit operate simultaneously, or makes the second charging circuit, the first heating circuit, and the second heating circuit operate simultaneously, according to the external control signal.

In a connection mode, the first charging circuit or a first discharging circuit is formed by a first external DC charging and discharging port 104 and the power battery 101 by using the energy conversion device, and the second charging circuit or a second discharging circuit is formed by a second external DC charging and discharging port 105 and the power battery 101 by using the energy conversion device. The reversible PWM rectifier 102 further includes a first bus terminal and a second bus terminal. A first end of the first external DC charging and discharging port 104 is connected with a first neutral line of the first winding unit 131 of the motor coil 103. A first end of the second external DC charging and discharging port 105 is connected with a second neutral line of the second winding unit 132 of the motor coil 103. A second end of the first external DC charging and discharging port 104 and a second end of the second external DC charging and discharging port 105 are connected with the second bus terminal, a positive terminal of the power battery 101 is connected with the first bus terminal, and a negative terminal of the power battery 101 is connected with the second bus terminal. In this embodiment, two external DC charging and discharging ports are disposed, to make two sets of winding units respectively connect to the two DC charging and discharging ports to form the charging circuit or the discharging circuit. In addition, the currents outputted from the two external DC charging and discharging ports simultaneously flow through the correspondingly connected winding units, thereby achieving a larger heating power.

In another embodiment, a third external DC charging and discharging port 110 is further included. At least two sets of heating circuits are formed by the third external DC charging and discharging port 110, the reversible PWM rectifier 102, and the winding unit of the motor coil 103. The third external DC charging and discharging port 110 is connected with two ends of the reversible PWM rectifier 102.

The third external DC charging and discharging port 110 is connected to the first bus terminal and the second bus terminal of the reversible PWM rectifier 102. The first heating circuit is formed by the third external DC charging and discharging port 110, the reversible PWM rectifier 102, and the first winding unit 131, and the second heating circuit is formed by the third external DC charging and discharging port 110, the reversible PWM rectifier 102, and the second winding unit 132.

In this embodiment, the reversible PWM rectifier 102 is controlled according to the external control signal, to cause the current outputted from the third external DC charging and discharging port 110 to flow through the first winding unit 131 and the second winding unit 132 to generate heat, and cause the resultant current vector sum of the first winding unit 131 and the second winding unit 132 with respect to the quadrature axis in the synchronous rotating reference frame to be zero. In this way, the energy conversion device generates heat and does not output torque.

Figure 7:
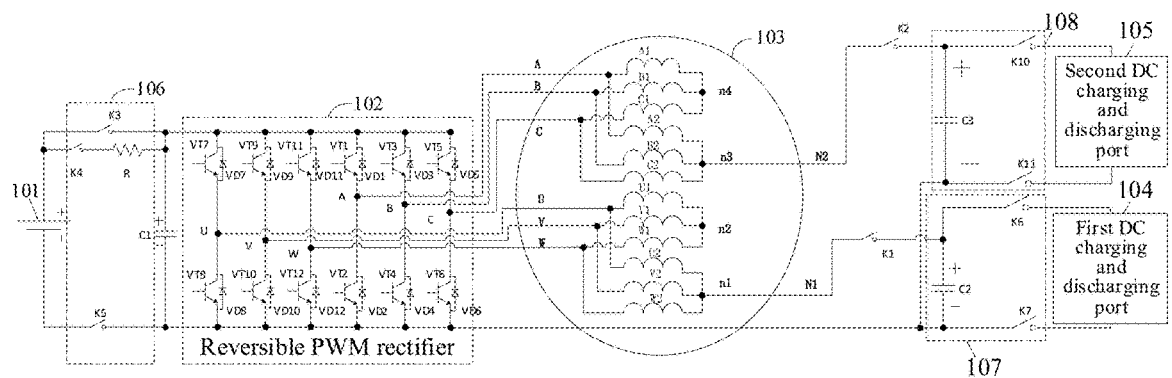
FIG. 7 is a circuit diagram of an energy conversion device according to an embodiment of the disclosure.

FIG. 7 is a circuit diagram of an energy conversion device according to this embodiment. By using $m_1=m_2=3$, $M_1=6$, $n_1=n_2=2$ as an example, the energy conversion device includes a reversible PWM rectifier 102, a motor coil 103, a first switch module 106, and a capacitor C1. The first switch module 106 includes a switch K3, a switch K4, a resistor R, and a switch K5. A positive electrode of the power battery 101 is connected with a first end of the switch K3 and a first end of the switch K4. A second end of the switch K4 is connected with a first end of the resistor R. A second end of the switch K3 and a second end of the resistor R are connected with a first end of the capacitor C1. A negative electrode of the battery is connected with a first end of the switch K5. A second end of the switch K5 is connected with a second end of the capacitor C1. The reversible PWM rectifier 102 includes six phase bridge arms. A first phase bridge arm includes a first power switch unit and a second power switch unit connected in series, a second phase bridge arm includes a third power switch unit and a fourth power switch unit connected in series, a third phase bridge arm includes a fifth power switch unit and a sixth power switch unit connected in series, a fourth phase bridge arm includes a seventh power switch unit and an eighth power switch unit connected in series, a fifth phase bridge arm includes a ninth power switch unit and a tenth power switch unit connected in series, and a sixth phase bridge arm includes an eleventh power switch unit and a twelfth power switch unit connected in series. An input terminal of the first power switch unit, an input terminal of the third power switch unit, an input terminal of the fifth power switch unit, an input terminal of the seventh power switch unit, an input terminal of the ninth power switch unit, and an input terminal of the eleventh power switch unit are connected together with the first end of the capacitor C1 to form a first bus terminal. An output terminal of the second power switch unit, an output terminal of the fourth power switch unit, an output terminal of the sixth power switch unit, an output terminal of the eighth power switch unit, an output terminal of the tenth power switch unit, and an output terminal of the twelfth power switch unit are connected together with the second end of the capacitor C1 to form a second bus terminal. The first power switch unit includes a first upper bridge arm VT1 and a first upper bridge diode VD1, the second power switch unit includes a second lower bridge arm VT2 and a second lower bridge diode VD2, and the third power switch unit includes a third upper bridge arm VT3 and the third upper bridge diode VD3. The fourth power switch unit includes a fourth lower bridge arm VT4 and a fourth lower bridge diode VD4, the fifth power switch unit includes a fifth upper bridge arm VT5 and a fifth upper bridge diode VDS, and the sixth power switch unit includes a sixth lower bridge arm VT6 and a sixth lower bridge diode VD6. The seventh power switch unit includes a seventh upper bridge arm VT7 and a seventh upper bridge diode VD7, the eighth power switch unit includes an eighth lower bridge arm VT8 and an eighth lower bridge diode VD8, and the ninth power switch unit includes a ninth upper bridge arm VT9 and a ninth upper bridge diode VD9. The tenth power switch unit includes a tenth lower bridge arm VT10 and a tenth lower bridge diode VD10, the eleventh power switch unit includes an eleventh upper bridge arm VT11 and an eleventh upper bridge diode VD11, and the twelfth power switch unit includes a twelfth lower bridge arm VT12 and a twelfth lower bridge diode VD12. The first winding unit 131 includes a set of three phase windings. Each phase winding includes two coils. A coil U1 and a coil U2 of a first phase coil are connected together with a midpoint U of the fourth phase bridge arm, a coil V1 and a coil V2 of a second phase coil are connected together with a midpoint V of the fifth phase bridge arm, and a coil W1 and a coil W2 of a third phase coil are connected together with a midpoint W of the sixth phase bridge arm. The coil U2, the coil V2, and the coil W2 are connected together to form a first connection point n1. A first independent neutral point is formed by the first connection point n1, and a first neutral line is led out from the first independent neutral point. The coil U1, the coil V1, and the coil W1 are connected together to form a second connection point n2. A second independent neutral point is formed by the second connection point n2. The second winding unit 132 includes a set of three phase windings. Each phase winding includes two coil branches. A coil A1 and a coil A2 in the first phase coil are connected together with a midpoint A of the first phase bridge arm, a coil B1 and a coil B2 in the second phase coil are connected together with a midpoint B of the second phase bridge arm, and a coil C1 and a coil C2 of the third phase coil are connected together with a midpoint C of the third phase bridge arm. The coil A1, the coil B1, and the coil C1 are connected together to form a fourth connection point n4, and the coil A2, the coil B2, and the coil C2 are connected together to form a third connection point n3. A third independent neutral point is formed by the third connection point n3, and a second neutral line is led out from the third independent neutral point.

The energy conversion module further includes a switch K1, a switch K2, a second switch module 107, and a third switch module 108. The second switch module 107 includes a switch K6, a switch K7, and a capacitor C2, and the third switch module 108 includes a switch K10, a switch K11, and a capacitor C3. The first end and the second end of the first external DC charging and discharging port 104 are respectively connected with a second end of the switch K6 and a second end of the switch K7. A first end of the switch K6 is connected with a second end of the switch K1 and a first end of the capacitor C2, and the first end of the switch K1 is connected with the first neutral line. A first end of the switch K7 is connected with the second end of the capacitor C2 and the second bus terminal of the reversible PWM rectifier 102, and the second neutral line is connected with a first end of the switch K2. A second end of the switch K2 is connected with a first end of the capacitor C3 and a first end of the switch K10, and a second end of the switch K10 is connected with the first end of the second DC charging and discharging port 105. A second end of the capacitor C3 is connected with a first end of the switch K11 and the second bus terminal, and a second end of the switch K11 is connected with the second end of the second DC charging and discharging port 105.

In this embodiment, the first DC charging and discharging port 104 and the second DC charging and discharging port 105 are respectively disposed to be connected with the first neutral line and the second neutral line. In this way, the heating circuit is formed by the first DC charging and discharging port 104, the first winding unit 131, and the reversible PWM rectifier 102. The heating circuit is formed by the second DC charging and discharging port 105, the second winding unit 132, and the reversible PWM rectifier 102. Furthermore, the charging and discharging circuit is formed by the first DC charging and discharging port 104 and the second DC charging and discharging port 105 with the power battery 101 by using the energy conversion device.

Figure 8:
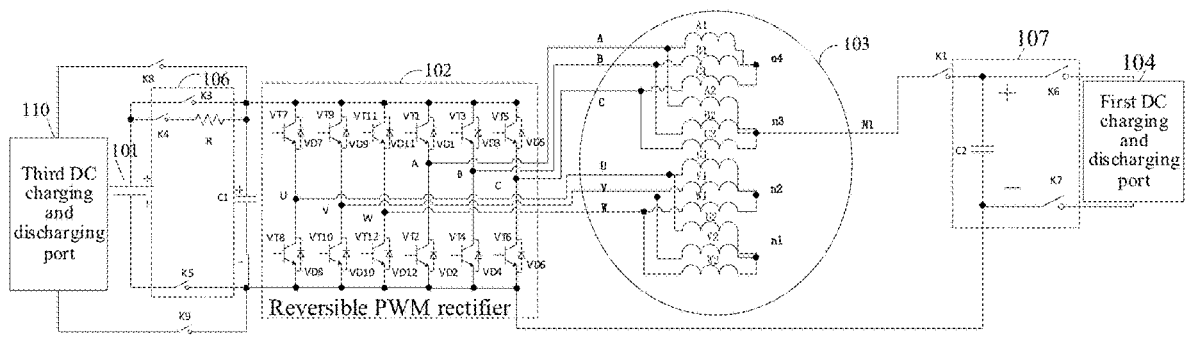
FIG. 8 is another circuit diagram of an energy conversion device according to an embodiment of the disclosure.

As shown in FIG. 8, a difference between FIG. 8 and FIG. 7 is that the switch K8 and the switch K9 are further included. The neutral point is formed by the third connection point n3, and the first neutral line is led out from the neutral point. The first neutral line is connected with the first end of the switch K1. The first end and the second end of the first external DC charging and discharging port 104 are respectively connected with the second end of the switch K6 and the second end of the switch K7. The first end of the switch K6 is connected with the second end of the switch K1 and the first end of the capacitor C2, and the first end of the switch K1 is connected with the first neutral line. The second end of the switch K7 is connected with the second end of the capacitor C2 and the second bus terminal of the reversible PWM rectifier 102, the first end of the third external DC charging and discharging port 110 is connected with a first end of the switch K8, and a second end of the switch K8 is connected with the second end of the switch K3. The second end of the third external DC charging and discharging port is connected with a first end of the switch K9, and a second end of the switch K9 is connected with the second end of the switch K5. In addition, the difference between FIG. 8 and FIG. 7 is that no second switch module is disposed in FIG. 8.

In this embodiment, the third DC charging and discharging port 110 is configured to be connected with the reversible PWM rectifier 102, so that two sets of heating circuits may be formed by the power battery 101, the reversible PWM rectifier 102, and the winding units in the motor coil 103. In addition, two sets of heating circuits may further be formed by the third DC charging and discharging port 110, the reversible PWM rectifier 102, and the winding units of the motor coil 103.

Figure 9:
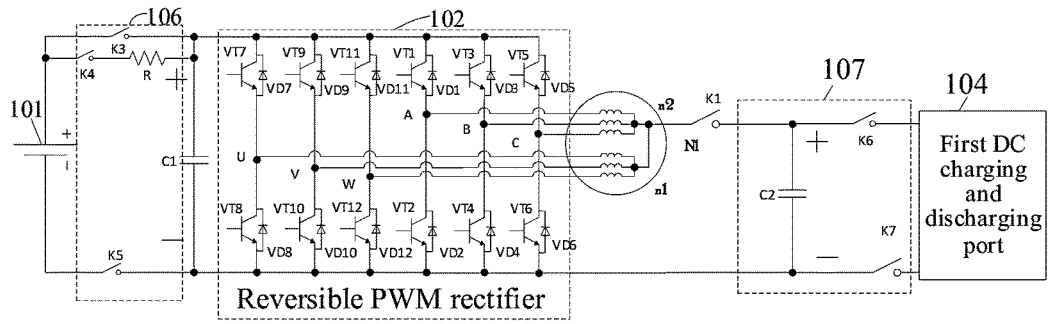
FIG. 9 is another circuit diagram of an energy conversion device according to an embodiment of the disclosure.

As shown in FIG. 9, a difference between FIG. 9 and FIG. 8 is that the number of the coil branch in the first winding unit 131 ($n_1$) and the number of the coil branch in the second winding unit 132 ($n_2$) are both 1. The first connection point n1 is formed by the first winding unit 131, and the second connection point n2 is formed by the second winding unit 132. The first connection point n1 and the second connection point n2 are connected together to form the first neutral point, and the first neutral line is led out from the first neutral point. The first neutral line is connected with the first end of the switch K1. The first end and the second end of the first external DC charging and discharging port 104 are respectively connected with the second end of the switch K6 and the second end of the switch K7. The first end of the switch K6 is connected with the second end of the switch K1 and the first end of the capacitor C2, and the first end of the switch K1 is connected with the first neutral line. The second end of the switch K7 is connected with the second end of the capacitor C2 and the second bus terminal of the reversible PWM rectifier 102.

In this embodiment, a first DC charging and discharging port 104 is disposed to be connected with the first neutral line, so that two sets of heating circuits may be formed by the first DC charging and discharging port 104, the winding units in the motor coil 103, and the reversible PWM rectifier 102 by disposing only one first DC charging and discharging port 104, and a charging and discharging circuit is formed by the first DC charging and discharging port 104 with the power battery 101 by using the energy conversion device.

Figure 10:
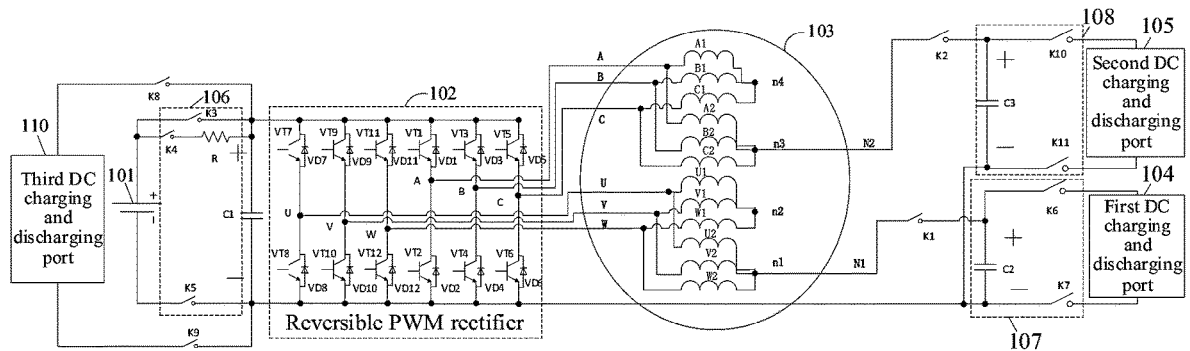
FIG. 10 is another circuit diagram of an energy conversion device according to an embodiment of the disclosure.

As shown in FIG. 10, a difference between FIG. 10 and FIG. 7 is that a switch K8 and switch K9 are further included. The first end of the third external DC charging and discharging port 110 is connected with the first end of the switch K8, and a second end of the switch K8 is connected with the second end of the switch K3. The second end of the third external DC charging and discharging port 110 is connected with a first end of the switch K9, and a second end of the switch K9 is connected with the second end of the switch K5.

In this embodiment, the first DC charging and discharging port 104, the second DC charging and discharging port 105, and the third DC charging and discharging port 110 are disposed. In this way, a set of heating circuits are formed by the first DC charging and discharging port 104, the first winding unit 131, and the reversible PWM rectifier 102, a set of heating circuits are formed by the second DC charging and discharging port 105, the second winding unit 132, and the reversible PWM rectifier 102, a set of heating circuits are formed by the third DC charging and discharging port 110, the reversible PWM rectifier 102, and the first winding unit 131, a set of heating circuits are formed by the third DC charging and discharging port 110, the reversible PWM rectifier 102, and the second winding unit 132, and a charging and discharging circuit may also be formed by the first DC charging and discharging port 104 and the second DC charging and discharging port 105 with the power battery 101 respectively by using the energy conversion device.

The specific working principle of the disclosure is described below for a specific circuit structure.

When the energy conversion device is only used for heating, the charging current is equal to 0, the torque is equal to 0, the target heating power P is acquired, and the target resultant current vector of each set of the winding unit is calculated according to the following formula:

$$P = \frac{m}{2} n R_s (i_s^*)^2 = \frac{m}{2} R_s \left[ (i_{s1}^*)^2 + (i_{s2}^*)^2 + \ldots + (i_{sn}^*)^2 \right] \quad \text{(Equation 1)}$$

where P is the target heating power, $R_s$ is a phase resistance of each phase winding of an $n^{th}$ set of the winding unit operating in the heating circuit, $i_{sn}$ is the resultant current vector of currents of the $n^{th}$ set of the winding unit on the direct axis and the quadrature axis, and m is a number of phases of the bridge arm of the reversible PWM rectifier 102.

An amplitude of the vector $i^*_{sn}$ of the $n^{th}$ set of windings is controlled to be $|i_s^*|$, and $i^*_{sn}$ is always set on the direct axis, that is, $i^*_d = i^*_{d1} + i^*_{d2} + \ldots + i^*_{dn}$ and $i_d$ is not always 0. $i^*_q = i^*_{q1} = i^*_{q2} = \ldots = i^*_{qn} = 0$ is set or set to be equal to a smaller value near the value 0, the heating power is controlled by controlling the magnitude of $i^*_{dn}$, z is a number of sets of motor windings, and $1 \leq n \leq z$.

$i^*_{dn} = \pm i^*_d / n$ and $i^*_q = i^*_{q1} = i^*_{q2} = \ldots = i^*_{qn} = 0$ are set, that is, the heating power of each set of windings is equally divided. The effect of the setting mode is as follows. The heating power of each set of windings is equal, and the power between different windings is equalized. Each set of windings are uniformly distributed on the motor, and the heat is distributed uniformly. Therefore, a case of overheating of a certain set of windings will not occur. The lifespan of each set of windings of the motor is equalized. However, the current of each phase winding in each set of windings has an inconsistent magnitude, the heating of each phase winding is not completely equalized, and the use of an IGBT (or a MOSFET or a SiC or other semiconductor switch devices) and parallel diodes of the power device of each phase upper and lower bridge arm is unbalanced. Since the motor stops at a different position each time, the currents of each phase winding have inconsistent magnitude during the heating each time, the windings are basically used in an equalized manner, and the lifespan of the windings is equalized. The heating algorithm framework of in the method is consistent with the driving algorithm framework, and the algorithm structure is simple.

$i^*_{dn} = \pm i^*_d / n$ and $i^*_q = i^*_{q1} = i^*_{q2} = \ldots = i^*_{qn} = 0$ are set. $i^*_{dn}$ is controlled to be always on the direct axis from a positive axis to a negative axis and from the negative axis to the positive axis. A uniform change between the positive axis and the negative axis is made, or an alternate change is made between the positive and negative in the equal amplitude of the trapezoidal wave alternately change, or $$i_n^* = \sqrt{2} \left| \frac{id^*}{n} \right| \sin(wt) = \sqrt{2} \left| \frac{id^*}{n} \right| \sin(2\pi f_2 t)$$

is controlled, where $1 \leq n \leq z$, so as to ensure that an effective value of $i^*_{dn}$ is $i^*_d / n$ to maintain the heating power. In addition, $i^*_{dn}$ is caused to change according to the sinusoidal law of a certain frequency, and a sinusoidal variation at the same phase angle or a sinusoidal variation at different phase angles may be made between different $i^*_{dn}$. The technical effects of this embodiment are as follows. The heating power of each set of windings is equal, and the power between different windings is equalized. Each set of windings are uniformly distributed on the motor, and the heat is distributed uniformly. Therefore, a case of overheating of a certain set of windings will not occur. In addition, due to the equalized change in the electrical angle wt, the current appears evenly in each cycle. Although the current of each phase winding is not exactly the same, the signal with the sinusoidal variation of each phase current may cause the heating of each phase winding of each set of windings to be more equalized. The use of the IGBT (or a MOSFEET or other semiconductor switch devices) and parallel diodes of the power device of upper and lower bridge arm of each phase is equalized, which has the advantage of equalized use of each set of windings and the power device.

In another embodiment, $i^*_{Sn}$ is not always on the direct axis, $i^*_d = i^*_{d1} + i^*_{d2} + \ldots + i^*_{dn}$, $i^*_q = i^*_{q1} + i^*_{dq2} + \ldots + i^*_{qn}$ and ($i_d$ is not always 0), and $i^*_q$ is always equal to 0.

Method A: There is an even number of sets of winding units t of the motor.

Figure 11:
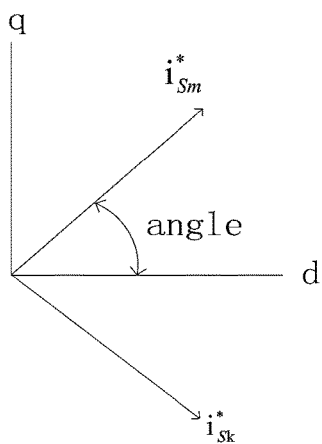
FIG. 11 is a schematic diagram of a resultant current vector in an energy conversion device located in a synchronous rotating reference frame based on motor rotor field orientation according to an embodiment of the disclosure.

According to Equation 1, $i_s$ is calculated from the heating power P, and $|i^*_{S1}| = |i^*_{S2}| = \ldots = "i^*_{Sn}| = |i^*_s| \neq 0$. An amplitude of the vector $i^*_{Sn}$ of the n sets of windings is controlled to be $|i^*_s|$, an angle of one resultant current vector $i^*_{Sn}$ any n/2 pairs of winding units of the n sets of the winding units is controlled to be angle, and an angle of the other resultant current vector $i^*_{Sk}$ is controlled to be –angle. $i^*_{Sm}$ and $i^*_{Sk}$ have the same magnitude and opposite directions, and $i^*_{Sm}$ and $i^*_{Sk}$ are symmetrical with respect to the direct axis (m≠k, referring to FIG. 11, for example, 1≤m≤n/2, n/2+1≤k≤t), so as to ensure that the sum of the resultant current vectors of all of the resultant current vectors on the quadrature axis is 0.

Figure 12:
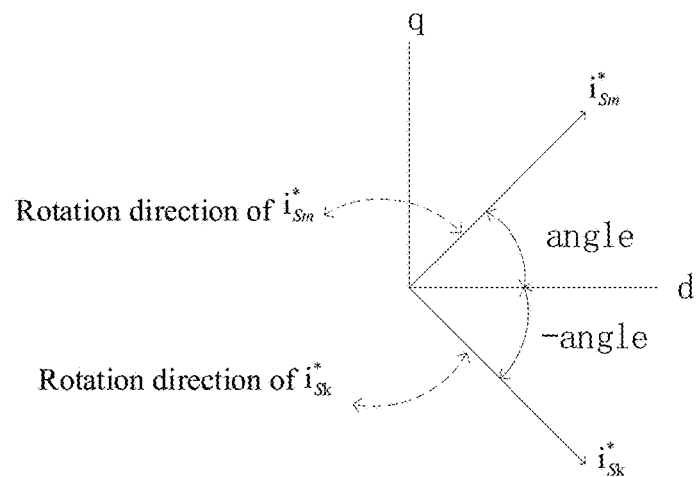
FIG. 12 is a schematic diagram of another resultant current vector in an energy conversion device located in a synchronous rotating reference frame based on motor rotor field orientation according to an embodiment of the disclosure.

In another embodiment, as shown in FIG. 12, the angle of one resultant current vector $i^*_{Sm}$ n/2 pairs of the winding units is a variable value. The angle between $i^*_{Sm}$ and the $i^*_{Sm}$ and the direct axis is controlled to increase uniformly from 0 to 180 and then decrease from 180 to 0 or increase uniformly from 0 to 360. During the uniform increase from 0 to 360, the continuously and uniformly changed angle=wt=2 $\pi f_2 t$, and $f_2$ is the change frequency of the amplitude of the resultant current vector.

The technical effects of this embodiment are as follows.
① each phase winding current in each set of the windings varies sinusoidally and has the same amplitude, and the frequency is $f_2$. The heating of each set of windings is the same, the heating of each phase winding is the same, the heating of each phase winding is completely equalized, and the temperature of the motor winding and each permanent magnet is uniform. Currents passing through the power devices (including a diode) of the upper and lower bridge arm are equalized, and the life of the power device are equalized.

The technology of the patent may cause each phase winding of the motor to perform heating evenly and the temperature of the motor winding and each permanent magnet to be uniform. In this way, the problem that the permanent magnet of the motor is prone to demagnetization due to the uneven heating temperature of some motors made of low-performance magnetic materials in the motor winding and each permanent magnet can be avoided. For example, the motor of a compressor easily weakens the anti-demagnetization ability of the motor in a low-temperature environment. Especially when the compressor fails to start in the low temperature environment, there is a great risk of demagnetization in the permanent magnet of the motor.
② The frequency $f_2$ is adjusted. Increase the heat generation of the battery by utilizing the different impedance of the battery at different frequency, the larger the impedance, the larger the heat generation. According to the different temperatures of the battery, the appropriate frequency $f_2$ is selected, so as to facilitate the system adjustment and response.

Method B: A number z of sets of motor windings is an odd number.

The amplitude of the vector $i^*_{Sz}$ of a $z^{th}$ set of windings is controlled to be zero, and the remaining (n-1) sets of windings are controlled as the even number of sets of windings. An angle between $i^*_{Sn}$ and the direct axis is optional, and $i^*_{dn}$ and $i^*_{qn}$ are calculated.

Alternatively, the vector $i^*_{Sz}$ of the $z^{th}$ set of windings is controlled to be on the direct axis, and the remaining (n-1) sets of windings are controlled as the even number of sets of windings. An included angle between $i^*_{Sn}$ and the direct axis is optional, and $i^*_{dn}$ and $i^*_{qn}$ are calculated.

The technical effects of this embodiment are as follows. The $z^{th}$ set of windings $i^*_{Sz}$ is not controlled to heat, which can be implemented in a simple way. The amplitude of the vector $i^*_{Sz}$ of the $z^{th}$ set of windings is controlled to $i^*_{dz} = \pm |is^*|$ or the amplitude of the vector $i^*_{dz}$ is controlled to be a sinusoidal signal superimposed with a DC offset or a sinusoidal signal, and $i^*_{qz} = 0$. The remaining windings are controlled as the even number of sets of windings, so as to achieve heating with the maximum power. Each set of windings are evenly distributed, so that the total heating is also equalized.

The technical solutions of the embodiments of the disclosure are specifically described below by using a specific circuit structure.

Figure 13:
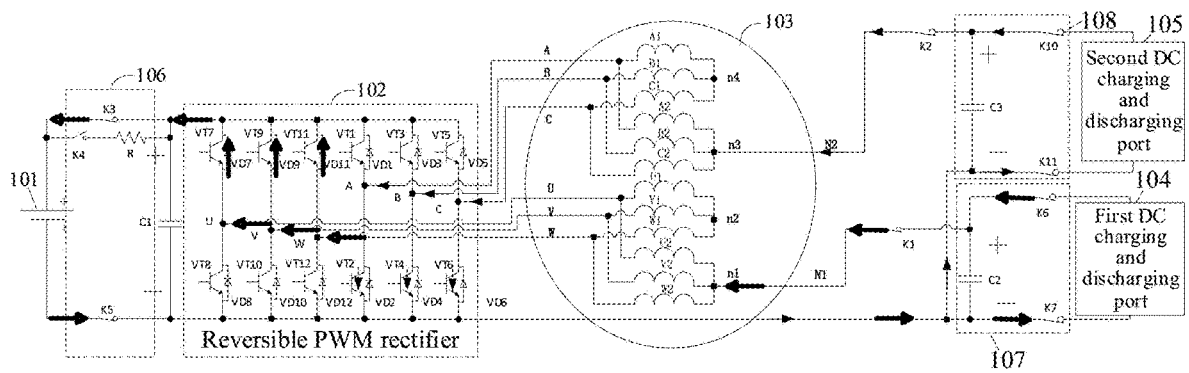
FIG. 13 is a current flow diagram of an energy conversion device according to an embodiment of the disclosure.
Figure 14:
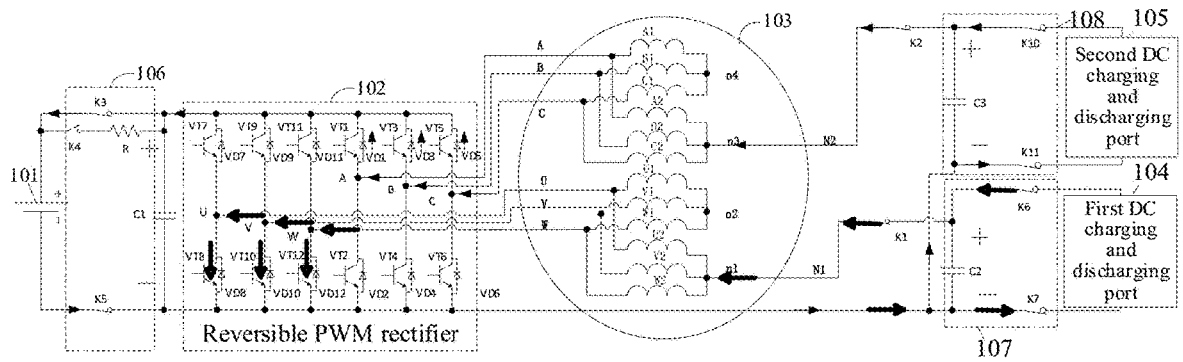
FIG. 14 is another current flow diagram of an energy conversion device according to an embodiment of the disclosure.

As shown in FIG. 13 and FIG. 14, when it is detected that the first DC charging and discharging port 104 is connected with a first DC power supply device, and the second DC charging and discharging port 105 is connected with a second DC power supply device, the first DC power supply device and the second DC power supply device simultaneously perform DC charging on the energy conversion device, and control the reversible PWM rectifier 102 in the same phase to operate. The implementation process is as follows.

The switch K4 and the switch K5 are controlled to be turned on to pre-charge the capacitor C1. The switch K1, the switch K2, the switch K3, the switch K6, the switch K7, the switch K10, and the switch K11 are kept being turned off. The switch K4 is controlled to be turned off after the pre-charging is completed and the switch K3 is controlled to be turned on. After a target voltage range value transmitted from the manager of the battery 101 is received, the switch K1 and the switch K2 are controlled to be turned on, and voltages of the capacitor C2 and the capacitor C3 are controlled. After voltages of the capacitor C2 and the capacitor C3 reaching at a set voltage, the switches K6, K7, K10, and K11 are controlled to be turned on. When it is determined that the sampled voltage U on the capacitor C2 and the capacitor C3 is within the transmitted target value range, the first DC power supply device and the second DC power supply device are controlled to officially start charging, or otherwise all of the switches are turned off and the charging is stopped.

As shown in FIG. 13, the second lower bridge arm VT2, the fourth lower bridge arm VT4, and the sixth lower bridge arm VT6 are controlled to turned on, the first upper bridge arm VT1, the third upper bridge arm VT3, and the fifth upper bridge arm VT5 are controlled to be turned off, the seventh upper bridge arm VT7, the ninth upper bridge arm VT9, and the eleventh upper bridge arm VT11 are controlled to be turned on, and the eighth lower bridge arm VT8, the tenth lower bridge arm VT10, and the twelfth lower bridge arm VT12 are controlled to be turned off. A first DC charging energy and storage release circuit is formed by the first DC power supply device, the switch K6, the switch K1, the first winding unit 131, the reversible PWM rectifier 102 (the seventh upper bridge diode VD7, the ninth upper bridge diode VD9, and the eleventh upper bridge diode VD11), the switch K3, the power battery 101, the switch K5, and the switch K7. In addition, a second DC charging and energy storage circuit is formed by the second DC power supply device, the switch K10, the switch K2, the second winding unit 132, the reversible PWM rectifier 102 (the second lower bridge arm VT2, the fourth lower bridge arm VT4, and the sixth lower bridge arm VT6), and the switch K11. The energy conversion device makes the first DC charging and energy storage release circuit and the second DC charging and energy storage circuit operate simultaneously according to the external control signal.

As shown in FIG. 14, the second lower bridge arm VT2, the fourth lower bridge arm VT4, and the sixth lower bridge arm VT6 are controlled to be turned off. The first upper bridge arm VT1, the third upper bridge arm VT3, and the fifth upper bridge arm VT5 are controlled to be turned on. In addition, the seventh upper bridge arm VT7, the ninth upper bridge arm VT9, and the eleventh upper bridge arm VT11 are controlled to be turned off, and the eighth lower bridge arm VT8, the tenth lower bridge arm VT10, and the twelfth lower bridge arm VT12 are controlled to be turned on. The first DC charging and energy storage circuit is formed by the first DC power supply device, the switch K6, the switch K1, the first winding unit 131, the reversible PWM rectifier 102 (the eighth lower bridge arm VT8, the tenth lower bridge arm VT10, and the twelfth lower bridge arm VT12), and the switch K7. In addition, the second DC charging energy and storage release circuit is formed by the second DC power supply device, the switch K10, the switch K2, the second winding unit 132, the reversible PWM rectifier 102 (the first upper bridge diode VD1, the third upper bridge diode VD3, and the fifth upper bridge diode VD5), the switch K3, the battery 101, the switch K5, and the switch K11. The energy conversion device makes the second DC charging energy and storage release circuit and the first DC charging and energy storage circuit to operate simultaneously according to the external control signal.

The energy conversion device controls the first DC charging and energy storage circuit and the first DC charging and energy storage release circuit to alternately operate according to the external control signal, so that the first DC power supply device charges the battery by using the energy conversion device. The second DC charging and energy storage circuit and the second DC charging and energy storage release circuit are controlled, according to the external control signal, to operate alternately, so that the second power supply device charges the battery by using the energy conversion device. In addition, the first DC charging and energy storage release circuit and the second DC charging and energy storage circuit operate simultaneously by means of phase-staggered control, and the second DC charging and energy storage release circuit and the first DC charging and energy storage circuit operate simultaneously, so that the first DC power supply device and the second DC power supply device simultaneously charge the power battery 101 by using the energy conversion device.

Figure 15:
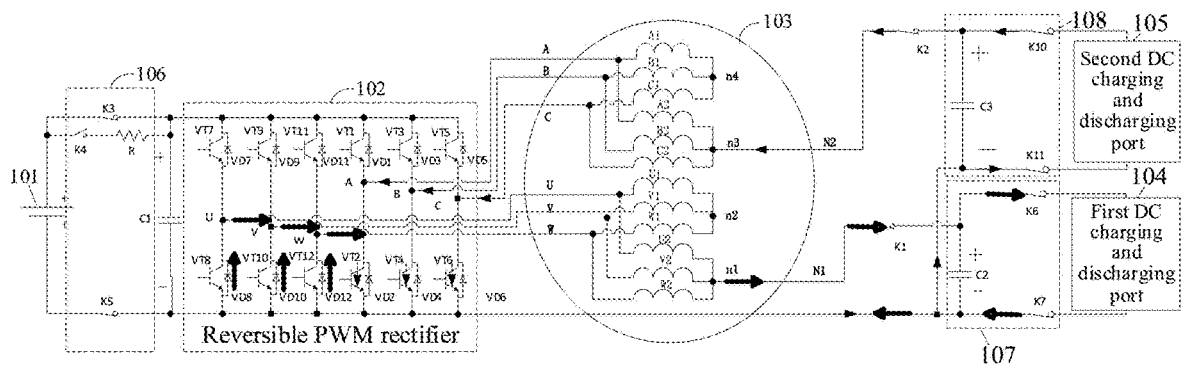
FIG. 15 is another current flow diagram of an energy conversion device according to an embodiment of the disclosure.
Figure 16:
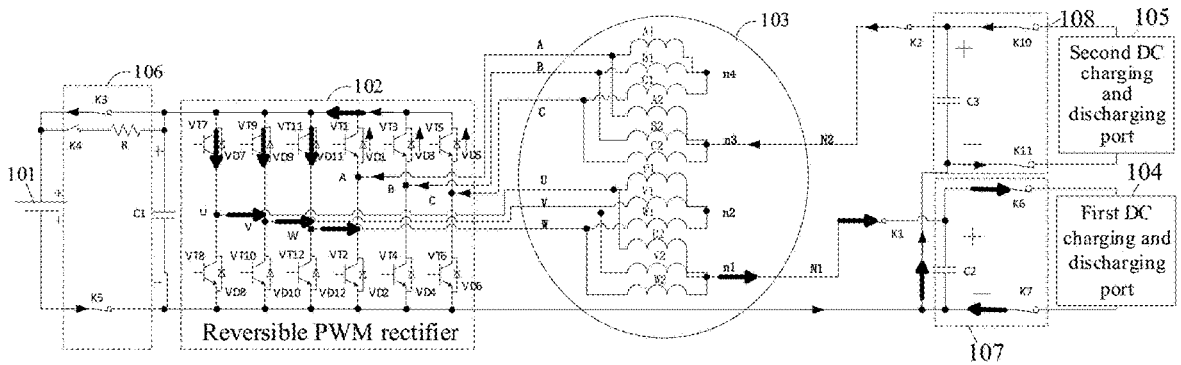
FIG. 16 is another current flow diagram of an energy conversion device according to an embodiment of the disclosure.

As shown in FIG. 15 and FIG. 16, the first DC charging and discharging port 104 is connected with the DC electric device, the second DC charging and discharging port 105 is connected with the DC charging device, and the power battery 101 is discharged to the DC electric device by using the energy conversion device. In addition, the DC charging device charges the power battery 101 by using the energy conversion device. The implementation process is as follows.

As shown in FIG. 15, the second lower bridge arm VT2, the fourth lower bridge arm VT4, and the sixth lower bridge arm VT6 are controlled to be turned on. The first upper bridge arm VT1, the third upper bridge arm VT3, and the fifth upper bridge arm VT5 are controlled to be turned off. In addition, the seventh upper bridge arm VT7, the ninth upper bridge arm VT9, and the eleventh upper bridge arm VT11 are controlled to be turned off, and the eighth lower bridge arm VT8, the tenth lower bridge arm VT10, and the twelfth lower bridge arm VT12 are controlled to be turned on. The DC discharging and energy storage release circuit is formed by the first winding unit 131, the switch K1, the switch K6, the DC electric device, the switch K7, and the reversible PWM rectifier 102 (the eighth lower bridge diode VD8, the tenth lower bridge diode VD10, and the twelfth lower bridge diode VD12). In addition, the DC charging and energy storage circuit is formed by the DC charging device, the switch K10, the switch K2, the second winding unit 132, the reversible PWM rectifier 102 (the second lower bridge arm VT2, the fourth lower bridge arm VT4, and the sixth lower bridge arm VT6), and the switch K11. The energy conversion device causes the DC discharging and energy storage release circuit and the DC charging and energy storage circuit to operate simultaneously according to the external control signal.

As shown in FIG. 16, the second lower bridge arm VT2, the fourth lower bridge arm VT4, and the sixth lower bridge arm VT6 are controlled to be turned off. The first upper bridge arm VT1, the third upper bridge arm VT3, and the fifth upper bridge arm VT5 are controlled to be turned on. In addition, the seventh upper bridge arm VT7, the ninth upper bridge arm VT9, and the eleventh upper bridge arm VT11 are controlled to be turned on, and the eighth lower bridge arm VT8, the tenth lower bridge arm VT10, and the twelfth lower bridge arm VT12 are controlled to be turned off. The DC discharging and energy storage circuit is formed by the capacitor C1, the reversible PWM rectifier 102 (the seventh upper bridge arm VT7, the ninth upper bridge arm VT9, and the eleventh upper bridge arm VT11), the first winding unit 131, the switch K1, the switch K6, the DC electric device, and the switch K7. In addition, the DC charging and energy storage release circuit is formed by the DC charging device, the switch K10, the switch K2, the second winding unit 132, the reversible PWM rectifier 102 (the first upper bridge diode VD1, the third upper bridge diode VD3, and the fifth upper bridge diode VD5), the switch K3, the power battery 101, the switch K5, and the switch K11. The energy conversion device makes the DC discharging and energy storage circuit and the DC charging and energy storage release circuit operate according to the external control signal.

The energy conversion device controls, according to the external control signal, the DC charging and energy storage circuit and the DC charging and energy storage release circuit to alternately operate, so that the DC power supply device charges the battery by using the energy conversion device. The DC discharging and energy storage circuit and the DC discharging and energy storage release circuit are controlled, according to the external control signal, to operate alternately, so that the power battery 101 discharges the DC electric device by using the energy conversion device. In addition, the DC charging and energy storage circuit and the DC discharging and energy storage release circuit operate simultaneously by means of out-of-phase control, to make the DC charging and energy storage release circuit and the DC discharging and energy storage circuit to operate simultaneously. Therefore, the DC power supply device charges the power battery 101 by using the energy conversion device while the power battery 101 is discharging the DC electric device by using the energy conversion device.

Figure 17:
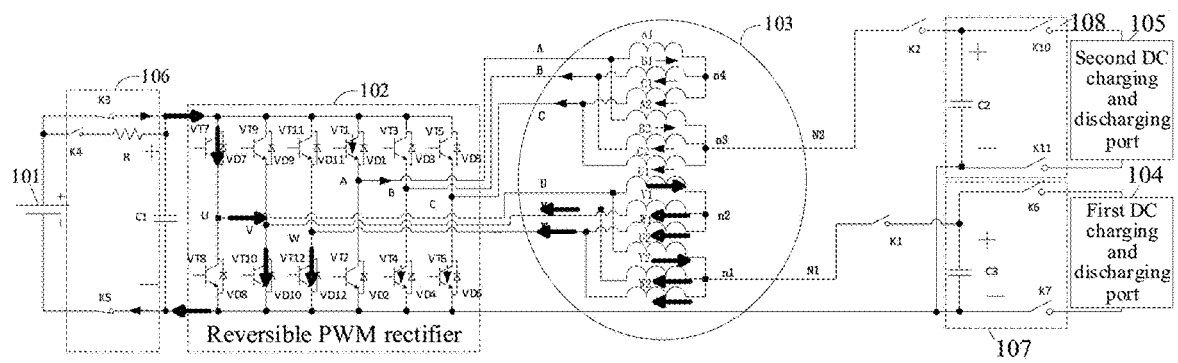
FIG. 17 is another current flow diagram of an energy conversion device according to an embodiment of the disclosure.
Figure 18:
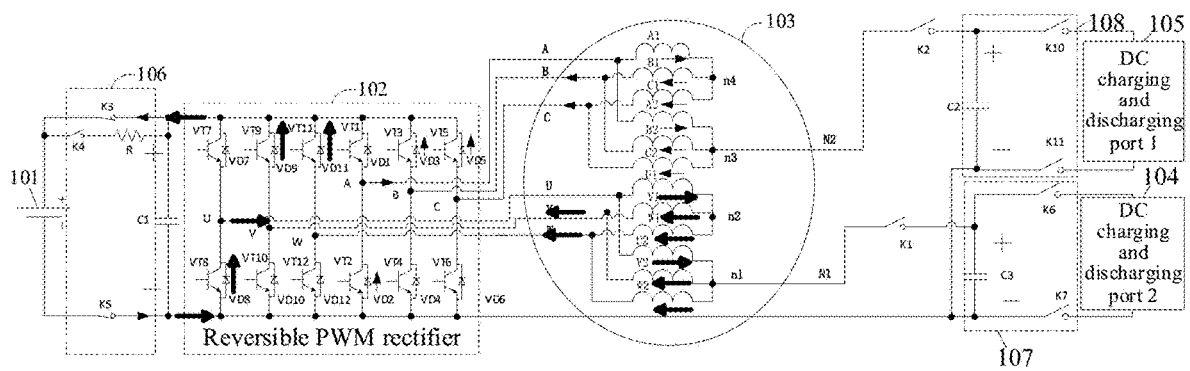
FIG. 18 is another current flow diagram of an energy conversion device according to an embodiment of the disclosure.

As shown in FIG. 17 and FIG. 18, the power battery 101 discharges the first winding unit 131 and the second winding unit 132 by using the energy conversion device. The implementation process is as follows.

As shown in FIG. 17, the first upper bridge arm VT1, the fourth lower bridge arm VT4, the sixth lower bridge arm VT6, the seventh upper bridge arm VT7, the tenth lower bridge arm VT10, and the twelfth lower bridge arm VT12 are controlled to be turned on. The second lower bridge arm VT2, the third upper bridge arm VT3, the fifth upper bridge arm VT5, the eighth lower bridge arm VT8, the ninth upper bridge arm VT9, and the eleventh upper bridge arm VT11 are controlled to be turned off. A first heating and energy storage circuit is formed by the power battery 101, the first upper bridge arm VT1, the second winding unit 132 (a coil A1 and a coil A2), the second winding unit 132 (a coil B1, a coil C1, a coil B2, and a coil C2), the fourth lower bridge arm VT4, and the sixth lower bridge arm VT6. A second heating and energy storage circuit is formed by the power battery 101, the seventh upper bridge arm VT7, the first winding unit 131 (a coil U1 and a coil U2), the first winding unit 131 (a coil V1, a coil W1, a coil V2, and a coil W2), the tenth lower bridge arm VT10, and the twelfth lower bridge arm VT12.

As shown in FIG. 18, the bridge arm in the reversible PWM rectifier 102 is controlled to be disconnected. A first heating and energy storage freewheeling circuit is formed by the first winding unit 131 (a coil A1 and a coil A2), the first winding unit 131 (a coil B1, a coil C1, a coil B2, and a coil C2), the third upper bridge diode VD3, and the fifth upper bridge diode VD5, the power battery 101, and the second lower bridge diode VD2. A second heating and energy storage freewheeling circuit is formed by the first winding unit 131 (a coil V1, a coil W1, a coil V2, and a coil W2), the first winding unit 131 (a coil U1 and a coil U2), the ninth upper bridge diode VD9, the eleventh upper bridge diode VD11, the power battery 101, and the eighth lower bridge diode VD8. The energy conversion device causes, according to the external control signal, the first heating and energy storage freewheeling circuit and the second heating and energy storage freewheeling circuit to operate simultaneously.

The controller acquires the target heating power, and the target resultant current vector of each set of winding unit is obtained according to the following formula:

$$P = \frac{3}{2} R_s [(i^*_{s1})^2 + (i^*_{s2})^2]$$

where P is the target heating power, $R_s$ is the phase resistance of each phase winding of the winding unit operating in the heating circuit, $i^*_{s1}$ is a resultant current vector of a direct axis current and a quadrature axis current of the first set of winding unit in the synchronous rotating reference frame, and $i^*_{s2}$ is a resultant current vector of a direct axis current and a quadrature axis current of the second set of the winding unit in the synchronous rotating reference frame.

The amplitude of the target resultant current vector of each set of the winding unit is obtained according to the target heating power and the above formula. The target direct axis current and the target quadrature axis current of each set of the winding unit respectively on the direct axis and the quadrature axis of the synchronous rotating reference frame are acquired according to the amplitude and the electrical angle of the target resultant current vector of each set of the winding unit. Then the actual quadrature axis current and the actual direct axis current of each set of winding unit are acquired according to a sampling current value and the rotor electrical angle of each set of the winding unit. Then obtain a first target voltage difference by performing a difference operation on the actual quadrature-axis current and the target quadrature-axis current of each set of the winding unit and then performing a PID (proportional integral derivative) operation. Obtain the second target voltage difference by performing a difference operation on the actual direct axis current and the target direct axis current of each set of winding unit and then performing a PID (proportional integral derivative) operation. Obtain the duty cycle of the first group of three phase bridge arms in the reversible PWM rectifier 102 connected with the first set of winding unit and the duty cycle of the second group of three phase bridge arms in the reversible PWM rectifier 102 connected with the second set of winding unit by performing inverse Park transformation on the first target voltage difference and the second target voltage difference and transmitting to a space vector pulse-width-modulation (SVPWM) algorithm, and obtain.

The controller controls, according to the duty cycle of the first group of three phase bridge arms and the duty cycle of the second group of three phase bridge arms, the first heating and energy storage circuit and the first heating and energy storage freewheeling circuit to operate alternately, so that the power battery 101 outputs a current to the first winding unit 131 by using the energy conversion device. In addition, the controller controls, according to the duty cycle of the first group of three phase bridge arms and the duty cycle of the second group of three phase bridge arms, the second heating and energy storage circuit and the second heating and energy storage freewheeling circuit to operate alternately, so that the power battery 101 outputs the current to the second winding unit 132 by using the energy conversion device.

Figure 19:
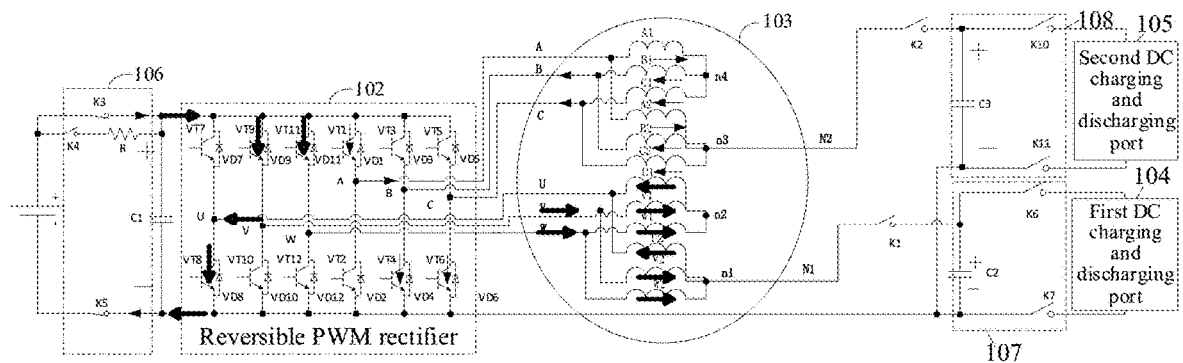
FIG. 19 is another current flow diagram of an energy conversion device according to an embodiment of the disclosure.
Figure 20:
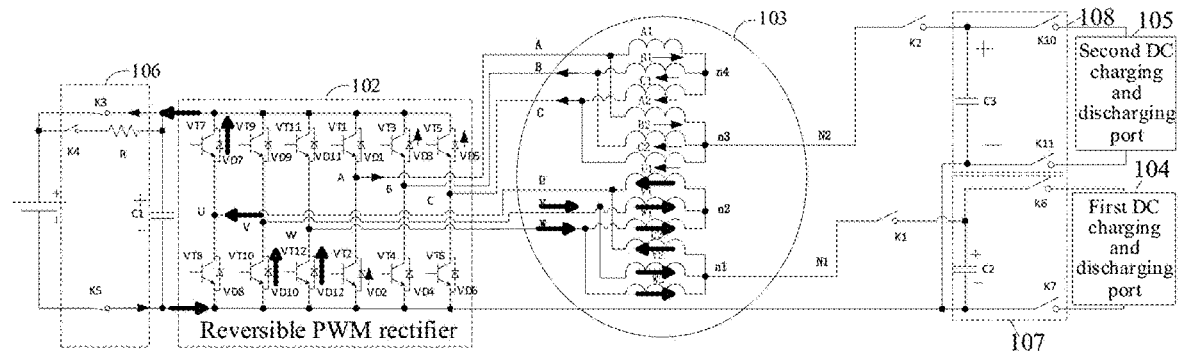
FIG. 20 is another current flow diagram of an energy conversion device according to an embodiment of the disclosure.

As shown in FIG. 19 and FIG. 20, the power battery 101 discharges the first winding unit 131 and the second winding unit 132 by using the energy conversion device. The implementation process is as follows.

As shown in FIG. 19, the first upper bridge arm VT1, the fourth lower bridge arm VT4, the sixth lower bridge arm VT6, the eighth lower bridge arm VT8, the ninth upper bridge arm VT9, and the eleventh upper bridge arm VT11 are controlled to be turned on. The second lower bridge arm VT2, the third upper bridge arm VT3, the fifth upper bridge arm VT5, the seventh upper bridge arm VT7, the tenth lower bridge arm VT10, and the twelfth lower bridge arm VT12 are controlled to be turned off. The first heating and energy storage circuit is formed by the power battery 101, the first upper bridge arm VT1, the second winding unit 132 (a coil A1 and a coil A2), the second winding unit 132 (a coil B1, a coil C1, a coil B2, and a coil C2), the fourth lower bridge arm VT4, and the sixth lower bridge arm VT6. The second heating and energy storage circuit is formed by the power battery 101, the ninth upper bridge arm VT9, the eleventh upper bridge arm VT11, the first winding unit 131 (a coil V1, a coil W1, a coil V2, and a coil W2), the first winding unit 131 (a coil U1 and a coil U2), and the eighth lower bridge arm VT8.

As shown in FIG. 20, the bridge arm in the reversible PWM rectifier 102 is controlled to be turned off. A first heating and energy storage freewheeling circuit is formed by the first winding unit 131 (a coil A1 and a coil A2), the first winding unit 131 (a coil B1, a coil C1, a coil B2, and a coil C2), the third upper bridge diode VD3, and the fifth upper bridge diode VDS, the power battery 101, and the second lower bridge diode VD2. A second heating and energy storage freewheeling circuit is formed by the first winding unit 131 (a coil V1, a coil W1, a coil V2, and a coil W2), the first winding unit 131 (a coil U1 and a coil U2), the seventh upper bridge diode VD7, the power battery 101, the tenth lower bridge diode VD10, and the twelfth lower bridge diode VD12. The energy conversion device causes, according to the external control signal, the first heating and energy storage freewheeling circuit and the second heating and energy storage freewheeling circuit to operate simultaneously.

The energy conversion device controls, according to the external control signal, the first heating and energy storage circuit and the first heating and energy storage freewheeling circuit to operate alternately, so that the power battery 101 outputs a current to the first winding unit 131 by using the energy conversion device; and controls, according to the external control signal, the second heating and energy storage circuit and the second heating and energy storage freewheeling circuit to operate alternately, so that the power battery 101 outputs the current to the second winding unit 132 by using the energy conversion device.

Figure 21:
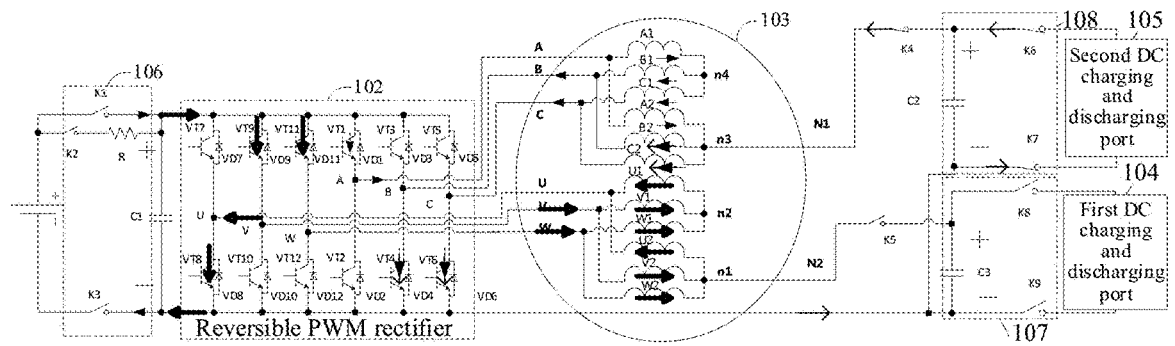
FIG. 21 is another current flow diagram of an energy conversion device according to an embodiment of the disclosure.
Figure 22:
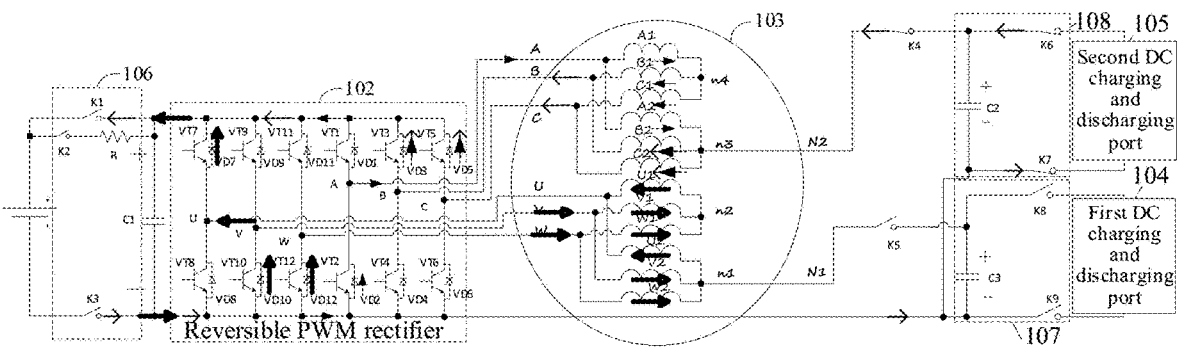
FIG. 22 is another current flow diagram of an energy conversion device according to an embodiment of the disclosure.

As shown in FIG. 21 and FIG. 22, the power battery 101 discharges the first winding unit 131 and the second winding unit 132 by using the energy conversion device. The implementation process is as follows.

As shown in FIG. 21, the first upper bridge arm VT1, the fourth lower bridge arm VT4, the sixth lower bridge arm VT6, the eighth lower bridge arm VT8, the ninth upper bridge arm VT9, and the eleventh upper bridge arm VT11 are controlled to be turned on. The second lower bridge arm VT2, the third upper bridge arm VT3, the fifth upper bridge arm VT5, the seventh upper bridge arm VT7, the tenth lower bridge arm VT10, and the twelfth lower bridge arm VT12 are controlled to be turned off. The first heating and energy storage circuit is formed by the power battery 101, the first upper bridge arm VT1, the second winding unit 132 (a coil A1 and a coil A2), the second winding unit 132 (a coil B1, a coil C1, a coil B2, and a coil C2), the fourth lower bridge arm VT4, and the sixth lower bridge arm VT6. The second heating and energy storage circuit is formed by the power battery 101, the ninth upper bridge arm VT9, the eleventh upper bridge arm VT11, the first winding unit 131 (a coil V1, a coil W1, a coil V2, and a coil W2), the first winding unit 131 (a coil U1 and a coil U2), and the eighth lower bridge arm VT8. The energy conversion device makes, according to the external control signal, the first heating and energy storage circuit and the second heating and energy storage circuit operate simultaneously. The first DC charging and energy storage circuit is formed by the second DC charging and discharging port 105, the second winding unit 132 (a coil Bl, a coil C1, a coil B2, and a coil C2), the fourth lower bridge arm VT4, and the sixth lower bridge arm VT6.

As shown in FIG. 22, the bridge arm in the reversible PWM rectifier 102 is controlled to be turned off. A first heating and energy storage freewheeling circuit is formed by the second winding unit 132 (a coil A1 and a coil A2), the second winding unit 132 (a coil Bl, a coil C1, a coil B2, and a coil C2), the third upper bridge diode VD3, and the fifth upper bridge diode VDS, the power battery 101, and the second lower bridge diode VD2. A second heating and energy storage freewheeling circuit is formed by the first winding unit 131 (a coil V1, a coil W1, a coil V2, and a coil W2), the first winding unit 131 (a coil U1 and a coil U2), the seventh upper bridge diode VD7, the power battery 101, the tenth lower bridge diode VD10, and the twelfth lower bridge diode VD12. The first DC charging and energy storage freewheeling circuit is formed by the second DC charging and discharging port 105, the second winding unit 132 (a coil B1, a coil C1, a coil B2, and a coil C2), the third upper bridge diode VD3, the fifth upper bridge diode VDS, and the power battery 101.

The energy conversion device controls, according to the external control signal, the first heating and energy storage circuit and the first heating and energy storage freewheeling circuit to operate alternately, so that the power battery outputs a current to the first winding unit 131 by using the energy conversion device; and controls, according to the external control signal, the second heating and energy storage circuit and the second heating and energy storage freewheeling circuit to operate alternately, so that the power battery outputs the current to the second winding unit 132 by using the energy conversion device; and controls, according to the external control signal, the first DC charging and energy storage circuit and the second DC charging and energy storage freewheeling circuit to operate alternately, so that the DC power supply device charges the battery by using the energy conversion device.

Embodiment II of the disclosure provides a vehicle. An electric vehicle further includes the energy conversion device provided in Embodiment I.

Figure 23:
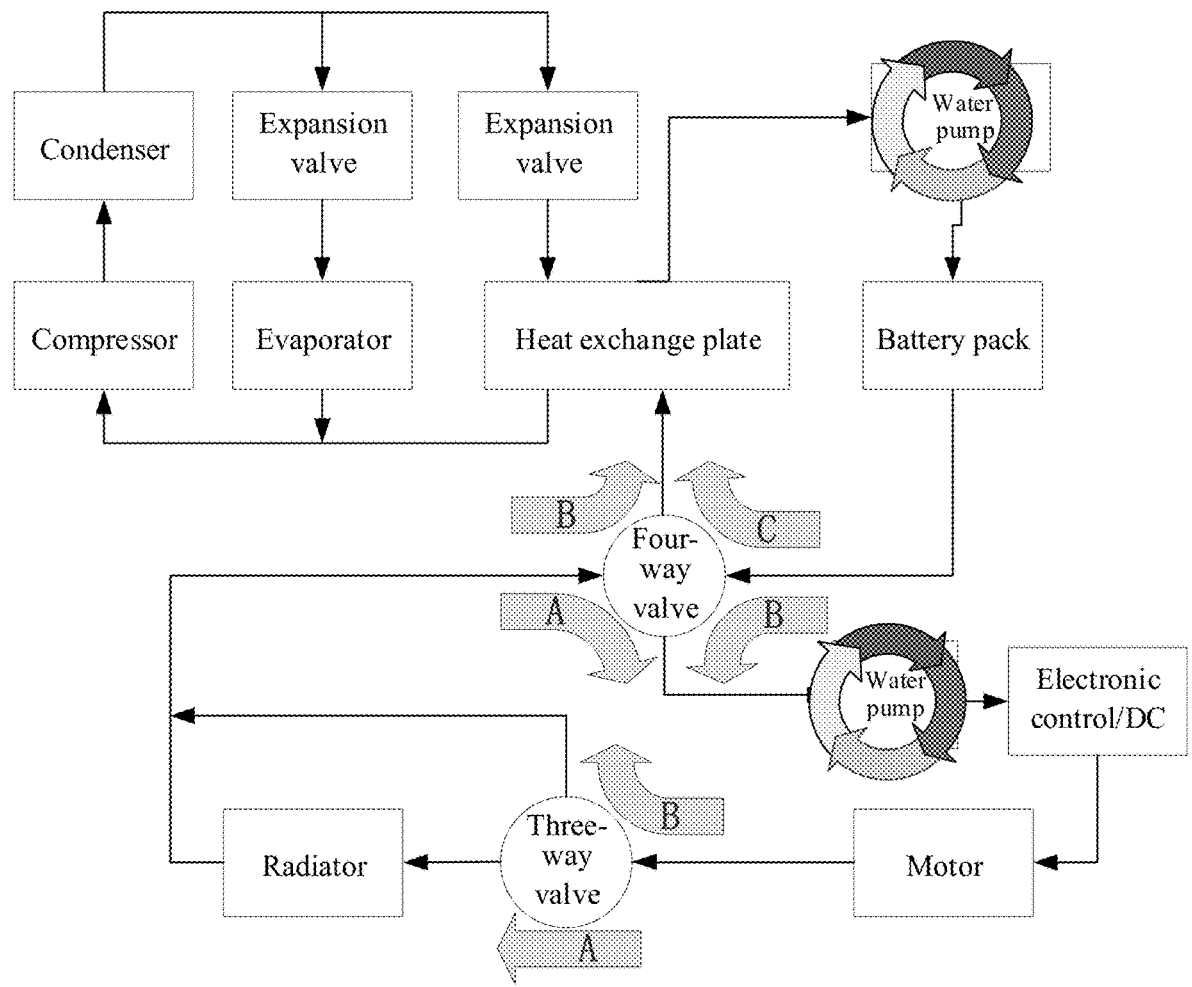
FIG. 23 is a schematic structural diagram of a vehicle according to another embodiment of the disclosure.

As shown in FIG. 23, a heating and cooling circuit of a battery pack includes the following circuits: a motor drive system cooling circuit, a battery cooling system circuit, and a cooling circuit of an air conditioning system. The battery cooling system circuit is integrated with an air conditioning cooling system by using a heat exchange plate. The battery cooling system circuit is connected with the motor drive system cooling circuit by using a four-way valve. The motor drive system cooling circuit turns on and off a radiator through switching of a three-way valve. The motor drive system cooling circuit and the battery cooling system circuit are switched by using a valve body to change a flow direction of a cooling liquid in the pipeline, so that the cooling liquid heated by the motor drive system flows to the battery cooling system, thereby completing the heat transfer from the motor drive system to the battery cooling system. When the motor drive system is in a non-heating mode, through the switching between the three-way valve and the four-way valve, the cooling liquid of the motor drive system passes through a circuit A, and the cooling liquid of the battery cooling system passes through a circuit C. When the motor is in a heating mode, through the switching between the three-way valve and the four-way valve, the cooling liquid of the motor drive system passes through a circuit B, so that the cooling liquid heated by the motor drive system flows to the cooling circuit of the battery pack to heat the battery.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

In addition, the terms "first" and "second" are used merely for the purpose of description, and shall not be construed as indicating or implying relative importance or implying a quantity of indicated technical features. Therefore, features defining "first" and "second" may explicitly or implicitly include one or more such features. In descriptions of this application, "multiple" means more, unless otherwise defined clearly and specifically.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; a direct connection, an indirect connection through an intermediate, or internal communication between two elements or an interaction relationship between two elements. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, schematic descriptions of the foregoing terms are not necessarily directed at the same embodiment or example. Moreover, the specific features, structures, materials, or characteristics described may be combined in any one or more embodiments or examples in a suitable manner. In addition, different embodiments or examples described in the present specification, as well as features of different embodiments or examples, may be integrated and combined by those skilled in the art without contradicting each other.

Although the embodiments of this application have been shown and described above, it can be understood that, the foregoing embodiments are exemplary and should not be understood as limitation to this application. A person of ordinary skill in the art can make changes, modifications, replacements, or variations to the foregoing embodiments within the scope of this application.

What is claimed is:

1. An energy conversion device, comprising a reversible pulse-width modulation (PWM) rectifier and a motor coil, wherein the motor coil comprises L sets of winding units, each set of winding unit is connected with the reversible PWM rectifier, and L≥2 and is a positive integer;

at least two sets of heating circuits of a to-be-heated device comprise an external power supply, the reversible PWM rectifier, and the winding units in the motor coil; and the energy conversion device controls the reversible PWM rectifier according to a control signal, so that a current outputted from the external power supply flows through at least two sets of the winding units of the motor coil to generate heat, and a vector sum of resultant current vectors of the at least two sets of the winding units on a quadrature axis of a synchronous rotating reference frame based on motor rotor field orientation is zero.

2. The energy conversion device according to claim 1, wherein when L1 sets of the winding units of the L sets of the winding units operate in the at least two sets of heating circuits, the L1 sets of the winding units respectively correspond to L1 resultant current vectors, and form $$\frac{L1}{2}$$

pairs of the resultant current vectors; amplitudes of two resultant current vectors of each pair of the resultant current vectors are equal; each pair of the resultant current vectors are symmetrical with respect to a direct axis of the synchronous rotating reference frame; L≥L1≥2; and L1 is an even number.

3. The energy conversion device according to claim 1, wherein when L1 sets of the winding units of the L sets of winding units operate in the at least two sets of heating circuits, the L1 sets of the winding units correspond to L1 resultant current vectors, and form $$\frac{L1}{2}$$

pairs of the resultant current vectors; amplitudes of two resultant current vectors of each pair of the resultant current vectors are equal; at least one pair of the resultant current vectors are symmetrical with respect to a direct axis in the synchronous rotating reference frame; angles of two resultant current vectors of at least one pair of the resultant current vectors differ by 180°; L≥L1≥2; and L1 is an even number.

4. The energy conversion device according to claim 1, wherein when L2 sets of the winding units of the L sets of the winding units operate in the at least two sets of heating circuits, the L2 sets of the winding units correspond to L2 resultant current vectors, and form $$\frac{L2-1}{2}$$

pairs of the resultant current vectors and a first resultant current vector; amplitudes of two resultant current vectors of each pair of the resultant current vectors are equal; each pair of the resultant current vectors are symmetrical with respect to a direct axis of the synchronous rotating reference frame; the first resultant current vector is located on the direct axis of the synchronous rotating reference frame; L≥L2≥3; and L2 is an odd number.

5. The energy conversion device according to claim 1, wherein
when L3 sets of the winding units of the L sets of the winding units operate in the at least two sets of heating circuits, the L3 sets of the winding units correspond to L3 resultant current vectors, and form $$\frac{L3-1}{2}$$

pairs of the resultant current vectors and a second resultant current vector; amplitudes of two resultant current vectors of each pair of the resultant current vectors are equal; angles of the two resultant current vectors of each pair of the resultant current vectors differ by 180°; the second resultant current vector is located on a direct axis of the synchronous rotating reference frame; L≥L3≥3; and L3 is an odd number.

6. The energy conversion device according to claim 2, wherein an angle of the resultant current vector of each of the L sets of the winding units with respect to the direct axis of the synchronous rotating reference frame is a fixed value.

7. The energy conversion device according to claim 2 4, wherein an angle of the resultant current vector of at least one pair of the winding units in the L sets of the winding units with respect to the direct axis of the synchronous rotating reference frame is a variable value; an angle of one resultant current vector of the pair of the resultant current vectors with respect to the direct axis of the synchronous rotating reference frame is $\theta_{L/2-1}=2\pi f_1 t+\theta_{L/2-0}$; an angle of the other resultant current vector of the resultant current vectors with respect to the direct axis of the synchronous rotating reference frame is $\theta_{L/2-2}=-\theta_{L/2-1}$; $f_1$ is a change frequency of the angle of the resultant current vector with respect to the direct axis of the synchronous rotating reference frame; $\theta_{L/2-0}$ is an initial angle of the angle of one of the pair of the resultant current vectors with respect to the direct axis of the synchronous rotating reference frame; and t is a time.

8. The energy conversion device according to claim 5, wherein an angle of the resultant current vector of at least one pair of the winding units in the L sets of the winding units with respect to the direct axis of the synchronous rotating reference frame is a variable value; an angle of one of the pair of the resultant current vectors with respect to the direct axis of the synchronous rotating reference frame is $\theta_{L/2-1}=2\pi f_1 t+\theta_{L/2-0}$; an angle of the other of the resultant current vectors with respect to the direct axis of the synchronous rotating reference frame is $\theta_{L/2-1}=2\pi f_1 t+\theta_{L/2-0}$; $f_1$ is a change frequency of the angle of the resultant current vector with respect to the direct axis of the synchronous rotating reference frame; $\theta_{L/2-0}$ is an initial angle of the angle of one of the pair of the resultant current vectors with respect to the direct axis of the synchronous rotating reference frame; and t is a time.

9. The energy conversion device according to claim 2, wherein
amplitudes of at least one pair of the resultant current vectors are equal and are variable values; the angles of the pair of the resultant current vectors with respect to the direct axis of the synchronous rotating reference frame are fixed values;
the amplitudes of the at least one pair of the resultant current vectors are $\sqrt{2}|i*_s|\sin(2\pi f_2)$; $f_2$ is a change frequency of the amplitudes of the resultant current vectors; and $\sqrt{2}|i*_s|$ is a maximum amplitude of the resultant current vectors.

10. The energy conversion device according to claim 1, comprising a controller which is connected with the reversible PWM rectifier and the controller is configured to:
acquire, according to an external control signal, a target heating power that needs to be generated by the motor coil;
obtain a target resultant current vector of each set of the winding unit according to the target heating power;
acquire a target direct axis current of each set of the winding unit on the direct axis of the synchronous rotating reference frame and acquire a target quadrature axis current of each set of the winding unit on the quadrature axis of the synchronous rotating reference frame according to the target resultant current vector; and
acquire an actual direct axis current of each set of the winding unit on the direct axis of the synchronous rotating reference frame and acquire an actual quadrature axis current of each set of the winding unit on the quadrature axis of the synchronous rotating reference frame according to a sampling current value of each set of the winding unit, and acquire a duty cycle of each phase bridge arm of the reversible PWM rectifier connected with each set of the winding unit according to the target quadrature axis current, the target direct axis current, the actual quadrature axis current, and the actual direct axis current.

11. The energy conversion device according to claim 10, wherein the external power supply is a power battery; the at least two sets of heating circuits are formed by the power battery, the reversible PWM rectifier, and the winding units in the motor coil;
the reversible PWM rectifier comprises a group of $M_1$ bridge arms; a first bus terminal and a second bus terminal are formed by the $M_1$ bridge arms; a positive terminal and a negative terminal of the power battery are respectively connected with the first bus terminal and the second bus terminal; the motor coil comprises a first winding unit and a second winding unit;
the first winding unit comprises a set of $m_1$ phase windings; each of the $m_1$ phase windings comprises $n_1$ coil branches; the $n_1$ coil branches of each phase winding are connected together to form a first phase endpoint; the first phase endpoints of the $m_1$ phase windings are connected in a one-to-one correspondence with midpoints of each $m_1$ bridge arms of the $M_1$ bridge arms; one of the $n_1$ coil branches of each of the $m_1$ phase windings is further connected with one of the $n_1$ coil branches of other phase windings of the $m_1$ phase windings to form $n_1$ connection points; $m_1 \geq 2$; $n_1 \geq 1$; and $n_1$, $M_1$, and $m_1$ are integers;
the second winding unit comprises a set of $m_2$ phase windings; each of the $m_2$ phase windings comprises $n_2$ coil branches; the $n_2$ coil branches of each phase winding are connected together to form a second phase endpoint; the second phase endpoints of the $m_2$ phase windings are connected in a one-to-one correspondence with midpoints of each of $m_2$ bridge arms of the $M_1$ bridge arms; one of the $n_2$ coil branches of each of the $m_2$ phase windings is further connected with one of the $n_2$ coil branches of other phase windings of the $m_2$ phase windings to form $n_2$ connection points; $m_2 \geq 2$; $M_1 \geq m_1 + m_2$; $n_2 \geq 1$; $n_2$, $m_2$ are integers;

a first heating circuit comprises the power battery, the reversible PWM rectifier, and the first winding unit; and a second heating circuit comprises the power battery, the reversible PWM rectifier, and the second winding unit.

12. The energy conversion device according to claim 10, wherein the at least two sets of heating circuits comprise an external direct current (DC) charging and discharging port, the winding units in the motor coil and the reversible PWM rectifier, and the external DC charging and discharging port is connected with at least one neutral line led out from the motor coil;

the external power supply is a DC power supply device, and the DC power supply device is connected with the external DC charging and discharging port;

the reversible PWM rectifier comprises a group of $M_1$ bridge arms, and the motor coil comprises a first winding unit and a second winding unit;

the first winding unit comprises a set of $m_1$ phase windings, each of the $m_1$ phase windings comprises $n_1$ coil branches; the $n_1$ coil branches of each phase winding are connected together to form a first phase endpoint; the first phase endpoints of the $m_1$ phase windings are connected in a one-to-one correspondence with midpoints of each of $m_1$ bridge arms of the $M_1$ bridge arms; one of the $n_1$ coil branches of each of the $m_1$ phase windings is further connected with one of the $n_1$ coil branches of the other phase windings of the $m_1$ phase windings to form $n_1$ connection points; $T_1$ neutral points are formed by the $n_1$ connection points; $J_1$ neutral lines are led out from the $T_1$ neutral points; $n_1 \geq T_1 \geq 1$; $T_1 \geq J_1 \geq 1$; $m_1 \geq 2$; and $n_1$, $m_1$, $M_1$, $T_1$, and $J_1$ are positive integers;

the second winding unit comprises a set of $m_2$ phase windings; each of the $m_2$ phase windings comprises $n_2$ coil branches; the $n_2$ coil branches of each phase winding are connected together to form a second phase endpoint; the second phase endpoints of the $m_2$ phase windings are connected in a one-to-one correspondence with midpoints of each of $m_2$ bridge arms of the $M_1$ bridge arms; one of the $n_2$ coil branches of each of the $m_2$ phase windings is further connected with one of the $n_2$ coil branches of the other phase windings of the $m_2$ phase windings to form $n_2$ connection points; $T_2$ neutral points are formed by the $n_2$ connection points; $J_2$ neutral lines are led out from the $T_2$ neutral points; $n_2 \geq T_2 \geq 1$; $T_2 \geq J_2 \geq 1$; $m_2 \geq 2$; $M_1 \geq m1 + m2$; $n_2$, $m_2$, $T_2$, and $J_2$ are positive integers;

a third heating circuit comprises the DC power supply device, the first winding unit, and the reversible PWM rectifier; and a fourth heating circuit comprises the DC power supply device, the second winding unit, and the reversible PWM rectifier.

13. The energy conversion device according to claim 10, wherein the external power supply is a power battery and a direct current (DC) power supply device; the power battery is connected with the reversible PWM rectifier; the external DC charging and discharging port is connected with at least one neutral line led out from the motor coil; and the DC power supply device is connected with the external DC charging and discharging port;

the at least two sets of heating circuits comprise the power battery, the reversible PWM rectifier, and the winding units in the motor coil, and a charging circuit comprises the DC power supply device, the motor coil, the reversible PWM rectifier, and the power battery; or the external power supply is a power battery, the power battery is connected with the reversible PWM rectifier, the external DC charging and discharging port is connected with the at least one neutral line led out from the motor coil, and the external DC charging and discharging port is connected with a DC electric device;

the at least two sets of heating circuits comprise the power battery, the reversible PWM rectifier, and the winding units in the motor coil; and a discharging circuit comprises the power battery, the reversible PWM rectifier, the motor coil, and the DC electric device; and the controller is further configured to:

acquire the target heating power that needs to be generated by the motor coil and a target charging power or a target discharging power of the power battery;

acquire a target charging current or a target discharging current of each set of the winding unit according to the target charging power or the target discharging power, and acquire a first heating power generated by each set of the winding unit according to the target charging current or the target discharging current;

acquire a second heating power generated by each set of the winding unit according to the target heating power and the first heating power generated by each set of winding unit;

obtain the target resultant current vector of each set of the winding unit according to the second heating power, and acquire the target direct axis current of each set of the winding unit on the direct axis of the synchronous rotating reference frame and acquire the target quadrature axis current of each set of the winding unit on the quadrature axis of the synchronous rotating reference frame according to the target resultant current vector;

acquire the actual direct axis current, the actual quadrature axis current, and a zero-axis current of each set of the winding unit respectively on the direct axis and the quadrature axis of the synchronous rotating reference frame according to the sampling current value of each set of the winding unit, and perform closed-loop control according to the target quadrature axis current, the target direct axis current, the actual quadrature axis current, and the actual direct axis current to acquire a first duty cycle of each phase bridge arm of the reversible PWM rectifier connected with each set of the winding unit;

perform closed-loop control according to the target charging current or the target discharging current and the zero-axis current to acquire a duty cycle adjustment value of the bridge arm of the reversible PWM rectifier connected with each set of the winding unit; and acquire the duty cycle of each phase bridge arm of the reversible PWM rectifier connected with each set of the winding unit according to the first duty cycle and the duty cycle adjustment value.

14. The energy conversion device according to claim 13, further comprising a bus capacitor, wherein a fifth heating circuit comprises the bus capacitor, the reversible PWM rectifier, and the first winding unit; a sixth heating circuit comprises the bus capacitor, the reversible PWM rectifier, and a second winding unit; and a charging circuit or a discharging circuit is formed by an external DC charging and discharging port and the power battery by using the energy conversion device.

15. The energy conversion device according to claim 13, wherein a first charging circuit or a first discharging circuit is formed by a first external DC charging and discharging port and the power battery through the energy conversion device; a second charging circuit or a second discharging circuit is formed by a second external DC charging and discharging port and the power battery through the energy conversion device; the reversible PWM rectifier further comprises a first bus terminal and a second bus terminal; a first end of the first external DC charging and discharging port is connected with a first neutral line of the first winding unit of the motor coil; a first end of the second external DC charging and discharging port is connected with a second neutral line of a second winding unit of the motor coil; a second end of the first external DC charging and discharging port and a second end of the second external DC charging and discharging port are connected with the second bus terminal; a positive terminal of the power battery is connected with the first bus terminal; and a negative terminal of the power battery is connected with the second bus terminal.

16. The energy conversion device according to claim 12, further comprising a third external DC charging and discharging port, wherein the at least two sets of heating circuits comprise the third external DC charging and discharging port, the reversible PWM rectifier, and the winding unit in the motor coil; and the third external DC charging and discharging port is connected with two ends of the reversible PWM rectifier.

17. A vehicle, comprising an energy conversion device comprising a reversible pulse-width modulation (PWM) rectifier and a motor coil, wherein
the motor coil comprises L sets of winding units, each set of winding unit is connected with the reversible PWM rectifier, and $L \geq 2$ and is a positive integer;
at least two sets of heating circuits of a to-be-heated device comprise an external power supply, the reversible PWM rectifier, and the winding units in the motor coil; and
the energy conversion device controls the reversible PWM rectifier according to a control signal, so that a current outputted from the external power supply flows through at least two sets of the winding units of the motor coil to generate heat, and a vector sum of resultant current vectors of the at least two sets of the winding units on a quadrature axis of a synchronous rotating reference frame based on motor rotor field orientation is zero.

* * * * *

UNITED STATES PATENT AND TRADEMARK OFFICE
CERTIFICATE OF CORRECTION

PATENT NO. : 11,916,504 B2
APPLICATION NO. : 17/763962
DATED : February 27, 2024
INVENTOR(S) : Heping Ling et al.

Page 1 of 1

It is certified that error appears in the above-identified patent and that said Letters Patent is hereby corrected as shown below:

In the Specification

Column 8, Line 26, that reads "reference frame is a" should read – reference frame is $\alpha$ –

Column 10, Line 9, that reads "reference frame is a" should read – reference frame is $\alpha$ –

Column 17, Line 44, that reads "i represents the resultant" should read – $i^*_{xs}$ represents the resultant –

Column 17, Line 46, that reads "and Rs, represents" should read – and $Rs_x$, represents –

Column 21, Line 24, that reads "bridge diode VDS" should read – bridge diode VD5 –

Column 25, Line 16, that reads "$i^*_d=i^*_{d1}+i^*_{d2}+...+i^*_{dn}, i^*_{q1}+i^*_{dq2}+...+i^*_{qn}$" should read – $i^*_d=i^*_{d1}+i^*_{d2}+...+i^*_{dn}, i^*_{q1}+i^*_{q2}+...+i^*_{qn}$ –

Column 25, Line 20, that reads "Equation 1, is is calculated" should read – Equation 1, $i^*_s$ is calculated –

Column 29, Line 39, that reads "bridge diode VDS" should read – bridge diode VD5 –

Column 31, Line 65, that reads "bridge diode VDS" should read – bridge diode VD5 –

Column 32, Line 9, that reads "bridge diode VDS" should read – bridge diode VD5 –

In the Claims

Claim 8, Column 35, Line 54, that reads "$\theta_{L/2-1} = 2\pi f_1 t + \theta_{L/2-0}$" should read – $\theta_{L/2-1} = 2\pi f_1 t + 180 + \theta_{L/2-0}$ –

Signed and Sealed this
Eighteenth Day of March, 2025

Coke Morgan Stewart
*Acting Director of the United States Patent and Trademark Office*